(12) United States Patent
Pervan

(10) Patent No.: US 7,841,144 B2
(45) Date of Patent: Nov. 30, 2010

(54) MECHANICAL LOCKING SYSTEM FOR PANELS AND METHOD OF INSTALLING SAME

(75) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 1011 days.

(21) Appl. No.: 11/092,748

(22) Filed: Mar. 30, 2005

(65) Prior Publication Data
US 2006/0236642 A1 Oct. 26, 2006

(51) Int. Cl.
*E04B 2/20* (2006.01)
(52) U.S. Cl. ............................ 52/395; 52/582.1; 52/391
(58) Field of Classification Search ................ 52/590.2, 52/592.1, 591.1, 592.3, 592.4, 578, 582.1, 52/582.2, 586.1, 585.1, 390, 392, 533, 534, 52/539, 553, 586.2, 588.1, 589.1, 590.3, 52/591.2, 591.3, 571.4, 591.5; 403/291, 403/315, 316, 319, 334, 345, 364, 365, 366, 403/367, 368, 372, 375, 376, 381; 292/1, 292/300, DIG. 38, DIG. 53
See application file for complete search history.

(56) References Cited

U.S. PATENT DOCUMENTS

| | | |
|---|---|---|
| 124,228 A | 3/1872 | Stuart |
| 213,740 A | 4/1879 | Conner |
| 714,987 A | 12/1902 | Wolfe |
| 753,791 A | 3/1904 | Fulghum |
| 1,124,228 A | 1/1915 | Houston |
| 1,194,636 A | 8/1916 | Joy |
| 1,371,856 A | 3/1921 | Cade |
| 1,407,679 A | 2/1922 | Ruthrauff |
| 1,454,250 A | 5/1923 | Parsons |
| 1,468,288 A | 9/1923 | Een |
| 1,477,813 A | 12/1923 | Daniels et al. |
| 1,510,924 A | 10/1924 | Daniels et al. |
| 1,540,128 A | 6/1925 | Houston |
| 1,575,821 A | 3/1926 | Daniels |
| 1,602,256 A | 10/1926 | Sellin |
| 1,602,267 A | 10/1926 | Karwisch |
| 1,615,096 A | 1/1927 | Meyers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |

(Continued)

FOREIGN PATENT DOCUMENTS

| | | |
|---|---|---|
| AT | 218725 B | 12/1961 |
| AU | 713628 | 1/1998 |
| AU | 200020703 A1 | 6/2000 |
| BE | 417526 | 9/1936 |
| BE | 0557844 | 6/1957 |

(Continued)

OTHER PUBLICATIONS

Webster's Dictionary, Random House: New York (1987), p. 862.
Knight's American Mechanical Dictionary, Hurd and Houghton: New York (1876), p. 2051.
Opposition EP 0.698,162 B1—Facts-Grounds-Arguments, dated Apr. 1, 1999, pp. 1-56.

(Continued)

*Primary Examiner*—Richard E Chilcot, Jr.
*Assistant Examiner*—Alp Akbasli
(74) *Attorney, Agent, or Firm*—Buchanan Ingersoll & Rooney PC

(57) ABSTRACT

Floor panels (1, 1') are provided with a mechanical locking system including a flexible locking element 15 in a locking groove 14 which during a horizontal motion is displaced vertically.

19 Claims, 10 Drawing Sheets

U.S. PATENT DOCUMENTS

| | | |
|---|---|---|
| 1,660,480 A | 2/1928 | Daniels |
| 1,714,738 A | 5/1929 | Smith |
| 1,718,702 A | 6/1929 | Pfiester |
| 1,723,306 A | 8/1929 | Sipe |
| 1,734,826 A | 11/1929 | Pick |
| 1,743,492 A | 1/1930 | Sipe |
| 1,764,331 A | 6/1930 | Moratz |
| 1,778,069 A | 10/1930 | Fetz |
| 1,787,027 A | 12/1930 | Wasleff |
| 1,790,178 A | 1/1931 | Sutherland, Jr. |
| 1,809,393 A | 6/1931 | Rockwell |
| 1,823,039 A | 9/1931 | Gruner |
| 1,859,667 A | 5/1932 | Gruner |
| 1,898,364 A | 2/1933 | Gynn |
| 1,902,716 A | 3/1933 | Newton |
| 1,906,411 A | 5/1933 | Potvin |
| 1,925,070 A | 8/1933 | Livezey |
| 1,929,871 A | 10/1933 | Jones |
| 1,940,377 A | 12/1933 | Storm |
| 1,953,306 A | 4/1934 | Moratz |
| 1,986,739 A | 1/1935 | Mitte |
| 1,988,201 A | 1/1935 | Hall |
| 1,995,264 A | 3/1935 | Mason |
| 2,015,813 A | 10/1935 | Nielsen |
| 2,026,511 A | 12/1935 | Storm |
| 2,044,216 A | 6/1936 | Klages |
| 2,088,238 A | 7/1937 | Ray |
| 2,089,075 A | 8/1937 | Siebs |
| 2,204,675 A | 6/1940 | Grunert |
| 2,266,464 A | 12/1941 | Kraft |
| 2,276,071 A | 3/1942 | Scull |
| 2,303,745 A | 12/1942 | Karreman |
| 2,324,628 A | 7/1943 | Kähr |
| 2,398,632 A | 4/1946 | Frost et al. |
| 2,430,200 A | 11/1947 | Wilson |
| 2,495,862 A | 1/1950 | Osborn |
| 2,596,280 A | 5/1952 | Nystrom |
| 2,732,706 A | 1/1956 | Friedman |
| 2,740,167 A | 4/1956 | Rowley |
| 2,780,253 A | 2/1957 | Joa |
| 2,851,740 A | 9/1958 | Baker |
| 2,865,058 A | 12/1958 | Andersson et al. |
| 2,894,292 A | 7/1959 | Gramelspacher |
| 2,947,040 A | 8/1960 | Schultz |
| 3,023,681 A | 3/1962 | Worson |
| 3,045,294 A | 7/1962 | Livezey, Jr. |
| 3,100,556 A | 8/1963 | De Ridder |
| 3,120,083 A | 2/1964 | Dahlberg et al. |
| 3,125,138 A | 3/1964 | Bolenbach |
| 3,182,769 A | 5/1965 | De Ridder |
| 3,200,553 A | 8/1965 | Frashour et al. |
| 3,203,149 A | 8/1965 | Soddy |
| 3,247,638 A | 4/1966 | Gay |
| 3,267,630 A | 8/1966 | Omholt |
| 3,282,010 A | 11/1966 | King, Jr. |
| 3,301,147 A | 1/1967 | Clayton et. al. |
| 3,310,919 A | 3/1967 | Bue et al. |
| 3,347,048 A | 10/1967 | Brown et al. |
| 3,377,931 A | 4/1968 | Hilton |
| 3,378,958 A | 4/1968 | Parks et al. |
| 3,387,422 A | 6/1968 | Wanzer |
| 3,436,888 A | 4/1969 | Ottosson |
| 3,460,304 A | 8/1969 | Braeuninger et al. |
| 3,481,810 A | 12/1969 | Waite |
| 3,508,523 A | 4/1970 | De Meerleer |
| 3,512,324 A | 5/1970 | Reed |
| 3,517,927 A | 6/1970 | Kennel |
| 3,526,071 A | 9/1970 | Hiroshi |
| 3,526,420 A | 9/1970 | Brancalone |
| 3,535,844 A | 10/1970 | Glaros |
| 3,538,665 A | 11/1970 | Gohner |
| 3,548,559 A | 12/1970 | Reville, Jr. et al. |
| 3,553,919 A | 1/1971 | Ohmolt |
| 3,554,850 A | 1/1971 | Kuhle |
| 3,555,762 A | 1/1971 | Costanzo, Jr. |
| 3,572,224 A | 3/1971 | Perry |
| 3,579,941 A | 5/1971 | Tibbals |
| 3,694,983 A | 10/1972 | Couquet |
| 3,714,747 A | 2/1973 | Curran |
| 3,731,445 A | 5/1973 | Hoffmann et al. |
| 3,742,669 A | 7/1973 | Mansfeld |
| 3,759,007 A | 9/1973 | Thiele |
| 3,768,846 A | 10/1973 | Hensley et al. |
| 3,786,608 A | 1/1974 | Boettcher |
| 3,842,562 A | 10/1974 | Daigle |
| 3,849,235 A | 11/1974 | Gwynne |
| 3,857,749 A | 12/1974 | Yoshida |
| 3,859,000 A | 1/1975 | Webster |
| 3,902,293 A | 9/1975 | Witt et al. |
| 3,908,053 A | 9/1975 | Hettich |
| 3,919,820 A | 11/1975 | Green |
| 3,936,551 A | 2/1976 | Elmendorf et al. |
| 3,988,187 A | 10/1976 | Witt et al. |
| 4,037,377 A | 7/1977 | Howell et al. |
| 4,082,129 A | 4/1978 | Morelock |
| 4,084,996 A | 4/1978 | Wheeler |
| 4,090,338 A | 5/1978 | Bourgade |
| 4,099,358 A | 7/1978 | Compaan |
| 4,100,710 A | 7/1978 | Kowallik |
| 4,107,892 A | 8/1978 | Bellem |
| 4,113,399 A | 9/1978 | Hansen, Sr. |
| 4,169,688 A | 10/1979 | Toshio |
| 4,196,554 A | 4/1980 | Anderson |
| 4,227,430 A | 10/1980 | Jansson et al. |
| 4,242,390 A | 12/1980 | Nemeth |
| 4,299,070 A | 11/1981 | Oltmanns et al. |
| 4,304,083 A | 12/1981 | Anderson |
| 4,426,820 A | 1/1984 | Terbrack et al. |
| 4,471,012 A | 9/1984 | Maxwell |
| 4,489,115 A | 12/1984 | Layman et al. |
| 4,501,102 A | 2/1985 | Knowles |
| 4,561,233 A | 12/1985 | Harter et al. |
| 4,567,706 A | 2/1986 | Wendt |
| 4,599,841 A | 7/1986 | Haid |
| 4,612,074 A | 9/1986 | Smith et al. |
| 4,612,745 A | 9/1986 | Hovde |
| 4,641,469 A | 2/1987 | Wood |
| 4,643,237 A | 2/1987 | Rosa |
| 4,646,494 A | 3/1987 | Saarinen et al. |
| 4,648,165 A | 3/1987 | Whitehorne |
| 4,653,242 A | 3/1987 | Ezard |
| 4,703,597 A | 11/1987 | Eggemar |
| 4,715,162 A | 12/1987 | Brightwell |
| 4,716,700 A | 1/1988 | Hagemeyer |
| 4,738,071 A | 4/1988 | Ezard |
| 4,769,963 A | 9/1988 | Meyerson |
| 4,819,932 A | 4/1989 | Trotter, Jr. |
| 4,822,440 A | 4/1989 | Hsu et al. |
| 4,831,806 A | 5/1989 | Niese et al. |
| 4,845,907 A | 7/1989 | Meek |
| 4,905,442 A | 3/1990 | Daniels |
| 5,029,425 A | 7/1991 | Bogataj |
| 5,113,632 A | 5/1992 | Hanson |
| 5,117,603 A | 6/1992 | Weintraub |
| 5,148,850 A | 9/1992 | Urbanick |
| 5,165,816 A | 11/1992 | Parasin |
| 5,179,812 A | 1/1993 | Hill |
| 5,182,892 A | 2/1993 | Chase |
| 5,216,861 A | 6/1993 | Meyerson |
| 5,247,773 A | 9/1993 | Weir |
| 5,253,464 A | 10/1993 | Nilsen |
| 5,271,564 A | 12/1993 | Smith |
| 5,286,545 A | 2/1994 | Simmons, Jr. |
| 5,295,341 A | 3/1994 | Kajiwara |

| | | | | | | |
|---|---|---|---|---|---|---|
| 5,344,700 A | 9/1994 | McGath et al. | 6,553,724 B1 | 4/2003 | Bigler | |
| 5,349,796 A | 9/1994 | Meyerson | 6,584,747 B2 | 7/2003 | Kettler et al. | |
| 5,390,457 A | 2/1995 | Sjölander | 6,591,568 B1 | 7/2003 | Pålsson | |
| 5,433,806 A | 7/1995 | Pasquali et al. | 6,601,359 B2 | 8/2003 | Olofsson | |
| 5,465,546 A | 11/1995 | Buse | 6,606,834 B2 | 8/2003 | Martensson et al. | |
| 5,474,831 A | 12/1995 | Nystrom | 6,647,689 B2 | 11/2003 | Pletzer et al. | |
| 5,497,589 A | 3/1996 | Porter | 6,647,690 B1 | 11/2003 | Martensson | |
| 5,502,939 A | 4/1996 | Zadok et al. | 6,670,019 B2 | 12/2003 | Andersson | |
| 5,540,025 A | 7/1996 | Takehara et al. | 6,672,030 B2 | 1/2004 | Schulte | |
| 5,560,569 A | 10/1996 | Schmidt | 6,684,592 B2 | 2/2004 | Martin | |
| 5,567,497 A | 10/1996 | Zegler et al. | 6,715,253 B2 | 4/2004 | Pervan | |
| 5,570,554 A | 11/1996 | Searer | 6,722,809 B2 | 4/2004 | Hamberger et al. | |
| 5,597,024 A | 1/1997 | Bolyard et al. | 6,763,643 B1 | 7/2004 | Martensson | |
| 5,598,682 A | 2/1997 | Haughian | 6,769,218 B2 | 8/2004 | Pervan | |
| 5,613,894 A | 3/1997 | Delle Vedove | 6,769,219 B2 * | 8/2004 | Schwitte et al. | 52/592.1 |
| 5,618,602 A | 4/1997 | Nelson | 6,854,235 B2 | 2/2005 | Martensson | |
| 5,630,304 A | 5/1997 | Austin | 6,862,857 B2 | 3/2005 | Tychsen | |
| 5,634,309 A | 6/1997 | Polen | 6,874,292 B2 | 4/2005 | Moriau et al. | |
| 5,653,099 A | 8/1997 | MacKenzie | 6,933,043 B1 | 8/2005 | Son et al. | |
| 5,671,575 A | 9/1997 | Wu | 7,003,924 B2 | 2/2006 | Kettler et al. | |
| 5,695,875 A | 12/1997 | Larsson et al. | 7,003,925 B2 | 2/2006 | Pervan | |
| 5,706,621 A | 1/1998 | Pervan | 7,022,189 B2 | 4/2006 | Delle Vedove | |
| 5,755,068 A | 5/1998 | Ormiston | 7,040,068 B2 | 5/2006 | Moriau et al. | |
| 5,768,850 A | 6/1998 | Chen | 7,051,486 B2 | 5/2006 | Pervan | |
| 5,797,237 A | 8/1998 | Finkell, Jr. | 7,275,350 B2 | 10/2007 | Pervan | |
| 5,823,240 A | 10/1998 | Bolyard et al. | 7,377,081 B2 | 5/2008 | Ruhdorfer | |
| 5,827,592 A | 10/1998 | Van Gulik et al. | 7,568,322 B2 | 8/2009 | Pervan | |
| 5,860,267 A | 1/1999 | Pervan | 7,584,583 B2 | 9/2009 | Bergelin et al. | |
| 5,899,038 A | 5/1999 | Stroppiana | 7,614,197 B2 | 11/2009 | Nelson | |
| 5,900,099 A | 5/1999 | Sweet et al. | 2001/0029720 A1 | 10/2001 | Pervan | |
| 5,925,211 A | 7/1999 | Rakauskas | 2002/0007608 A1 | 1/2002 | Pervan | |
| 5,935,668 A | 8/1999 | Smith | 2002/0007609 A1 | 1/2002 | Pervan | |
| 5,943,239 A | 8/1999 | Shamblin et al. | 2002/0014047 A1 | 2/2002 | Thiers | |
| 5,968,625 A | 10/1999 | Hudson | 2002/0020127 A1 | 2/2002 | Thiers et al. | |
| 5,987,839 A | 11/1999 | Hamar et al. | 2002/0031646 A1 | 3/2002 | Chen et al. | |
| 6,006,486 A | 12/1999 | Moriau et al. | 2002/0046528 A1 | 4/2002 | Pervan et al. | |
| 6,023,907 A | 2/2000 | Pervan | 2002/0056245 A1 | 5/2002 | Thiers | |
| 6,029,416 A | 2/2000 | Andersson | 2002/0069611 A1 | 6/2002 | Leopolder | |
| 6,052,960 A | 4/2000 | Yonemura | 2002/0083673 A1 | 7/2002 | Kettler et al. | |
| 6,094,882 A | 8/2000 | Pervan | 2002/0092263 A1 | 7/2002 | Schulte | |
| 6,101,778 A | 8/2000 | Martensson | 2002/0100231 A1 | 8/2002 | Miller et al. | |
| 6,119,423 A | 9/2000 | Costantino | 2002/0160610 A1 | 10/2002 | Arai et al. | |
| 6,134,854 A | 10/2000 | Stanchfield | 2002/0178673 A1 | 12/2002 | Pervan | |
| 6,148,884 A | 11/2000 | Bolyard et al. | 2002/0178674 A1 * | 12/2002 | Pervan | 52/385 |
| 6,173,548 B1 | 1/2001 | Hamar et al. | 2002/0178682 A1 | 12/2002 | Pervan | |
| 6,182,410 B1 | 2/2001 | Pervan | 2003/0009971 A1 | 1/2003 | Palmberg | |
| 6,203,653 B1 | 3/2001 | Seidner | 2003/0009972 A1 | 1/2003 | Pervan et al. | |
| 6,205,639 B1 | 3/2001 | Pervan | 2003/0024199 A1 | 2/2003 | Pervan et al. | |
| 6,209,278 B1 | 4/2001 | Tychsen | 2003/0033777 A1 | 2/2003 | Thiers et al. | |
| 6,216,403 B1 | 4/2001 | Belbeoc'h | 2003/0033784 A1 | 2/2003 | Pervan | |
| 6,216,409 B1 | 4/2001 | Roy et al. | 2003/0037504 A1 | 2/2003 | Schwitte et al. | |
| 6,247,285 B1 | 6/2001 | Mobeus | 2003/0041545 A1 | 3/2003 | Stanchfield | |
| 6,314,701 B1 * | 11/2001 | Meyerson ......... 52/588.1 | 2003/0084636 A1 | 5/2003 | Pervan | |
| 6,324,803 B1 | 12/2001 | Pervan | 2003/0101674 A1 | 6/2003 | Pervan et al. | |
| 6,332,733 B1 | 12/2001 | Hamberger et al. | 2003/0101681 A1 | 6/2003 | Tychsen | |
| 6,339,908 B1 | 1/2002 | Chuang | 2003/0115812 A1 | 6/2003 | Pervan | |
| 6,345,481 B1 | 2/2002 | Nelson | 2003/0115821 A1 | 6/2003 | Pervan | |
| 6,358,842 B1 | 3/2002 | Zhou et al. | 2003/0180091 A1 | 9/2003 | Stridsman | |
| 6,363,677 B1 | 4/2002 | Chen et al. | 2003/0188504 A1 | 10/2003 | Ralf | |
| 6,385,936 B1 | 5/2002 | Schneider | 2003/0196405 A1 * | 10/2003 | Pervan | 52/592.1 |
| 6,397,547 B1 | 6/2002 | Martensson | 2003/0221387 A1 | 12/2003 | Shah | |
| 6,421,970 B1 | 7/2002 | Martensson et al. | 2003/0233809 A1 | 12/2003 | Pervan | |
| 6,438,919 B1 | 8/2002 | Knauseder | 2004/0016196 A1 | 1/2004 | Pervan | |
| 6,446,405 B1 | 9/2002 | Pervan | 2004/0031227 A1 * | 2/2004 | Knauseder | 52/592.1 |
| 6,446,413 B1 | 9/2002 | Gruber | 2004/0035078 A1 | 2/2004 | Pervan | |
| 6,490,836 B1 | 12/2002 | Moriau et al. | 2004/0035079 A1 | 2/2004 | Evjen | |
| 6,497,079 B1 | 12/2002 | Pletzer et al. | 2004/0060255 A1 | 4/2004 | Knauseder | |
| 6,505,452 B1 | 1/2003 | Hannig et al. | 2004/0068954 A1 | 4/2004 | Martensson | |
| 6,510,665 B2 | 1/2003 | Pervan | 2004/0115921 A1 | 6/2004 | Clevenger et al. | |
| 6,516,579 B1 | 2/2003 | Pervan | 2004/0139678 A1 | 7/2004 | Pervan | |
| 6,526,719 B2 | 3/2003 | Pletzer et al. | 2004/0168392 A1 * | 9/2004 | Konzelmann et al. | 52/589.1 |
| 6,532,709 B2 | 3/2003 | Pervan | 2004/0177584 A1 | 9/2004 | Pervan | |
| 6,536,178 B1 | 3/2003 | Palsson et al. | 2004/0182036 A1 * | 9/2004 | Sjoberg et al. | 52/592.1 |

| | | | | | | |
|---|---|---|---|---|---|---|
| 2004/0200175 A1* | 10/2004 | Weber ............... 52/592.1 | DE | 2 616 077 | | 10/1977 |
| 2004/0206036 A1 | 10/2004 | Pervan | DE | 2 917 025 | | 11/1980 |
| 2004/0211143 A1* | 10/2004 | Hanning .............. 52/578 | DE | 30 41781 | A1 | 6/1982 |
| 2004/0241374 A1 | 12/2004 | Thiers et al. | DE | 32 14 207 | A1 | 11/1982 |
| 2004/0255541 A1 | 12/2004 | Thiers et al. | DE | 32 46 376 | C2 | 6/1984 |
| 2005/0034404 A1 | 2/2005 | Pervan | DE | 33 43 601 | A1 | 6/1985 |
| 2005/0034405 A1 | 2/2005 | Pervan | DE | 35 38 538 | A1 | 10/1985 |
| 2005/0097860 A1 | 5/2005 | Martensson | DE | 86 04 004 | | 6/1986 |
| 2005/0102937 A1 | 5/2005 | Pervan | DE | 35 12 204 | A1 | 10/1986 |
| 2005/0108970 A1 | 5/2005 | Liu | DE | 35 44 845 | A1 | 6/1987 |
| 2005/0138881 A1 | 6/2005 | Pervan | DE | 36 31 390 | A1 | 12/1987 |
| 2005/0160694 A1 | 7/2005 | Pervan | DE | 40 02 547 | A1 | 8/1991 |
| 2005/0161468 A1 | 7/2005 | Wagner | DE | 40 30 115 | A1 | 9/1991 |
| 2005/0166516 A1 | 8/2005 | Pervan | DE | 41 34 452 | A1 | 4/1993 |
| 2005/0193677 A1 | 9/2005 | Vogel | DE | 42 15 273 | A1 | 11/1993 |
| 2005/0208255 A1 | 9/2005 | Pervan | DE | 42 42 530 | A1 | 6/1994 |
| 2005/0210810 A1 | 9/2005 | Pervan | DE | 43 13 037 | C1 | 8/1994 |
| 2005/0235593 A1* | 10/2005 | Hecht ............... 52/592.1 | DE | 93 17 191 | U1 | 3/1995 |
| 2005/0252130 A1 | 11/2005 | Martensson | DE | 0 665 347 | | 8/1995 |
| 2005/0268570 A2 | 12/2005 | Pervan | DE | 296 10 462 | | 10/1996 |
| 2006/0032168 A1 | 2/2006 | Thiers | DE | 196 01 322 | A1 | 5/1997 |
| 2006/0048474 A1 | 3/2006 | Pervan | DE | 296 18 318 | U1 | 5/1997 |
| 2006/0070333 A1* | 4/2006 | Pervan ............... 52/592.1 | DE | 297 10 175 | U1 | 9/1997 |
| 2006/0073320 A1 | 4/2006 | Pervan et al. | DE | 196 51 149 | A1 | 6/1998 |
| 2006/0075713 A1 | 4/2006 | Pervan et al. | DE | 197 09 641 | A1 | 9/1998 |
| 2006/0101769 A1* | 5/2006 | Pervan et al. ............... 52/591.1 | DE | 197 18 319 | A1 | 11/1998 |
| 2006/0117696 A1 | 6/2006 | Pervan | DE | 197 18 812 | A1 | 11/1998 |
| 2006/0179773 A1 | 8/2006 | Pervan | DE | 299 22 649 | U1 | 4/2000 |
| 2006/0196139 A1 | 9/2006 | Pervan | DE | 200 01 225 | U1 | 8/2000 |
| 2006/0236642 A1 | 10/2006 | Pervan | DE | 200 02 744 | U1 | 9/2000 |
| 2006/0260254 A1 | 11/2006 | Pervan | DE | 199 40 837 | A1 | 11/2000 |
| 2006/0283127 A1 | 12/2006 | Pervan | DE | 199 25 248 | A1 | 12/2000 |
| 2007/0006543 A1 | 1/2007 | Engstrom | DE | 200 13 380 | | 12/2000 |
| 2007/0028547 A1 | 2/2007 | Grafenauer et al. | DE | 200 17 461 | U1 | 3/2001 |
| 2007/0119110 A1 | 5/2007 | Pervan | DE | 200 18 284 | U1 | 3/2001 |
| 2007/0151189 A1 | 7/2007 | Yang | DE | 199 58 225 | A1 | 6/2001 |
| 2007/0193178 A1 | 8/2007 | Groeke et al. | DE | 100 01 248 | | 7/2001 |
| 2008/0000186 A1 | 1/2008 | Pervan | DE | 100 32 204 | C1 | 7/2001 |
| 2008/0010931 A1 | 1/2008 | Pervan | DE | 100 44 016 | A1 | 3/2002 |
| 2008/0010937 A1 | 1/2008 | Pervan | DE | 202 05 774 | | 8/2002 |
| 2008/0028707 A1 | 2/2008 | Pervan | DE | 203 07 580 | U1 | 7/2003 |
| 2008/0034708 A1 | 2/2008 | Pervan | DE | 203 17 527 | | 1/2004 |
| 2008/0066415 A1 | 3/2008 | Pervan | DE | 20 2004 001 038 | U1 | 5/2004 |
| 2008/0104921 A1 | 5/2008 | Pervan | DE | 20 2005 006 300 | U1 | 8/2005 |
| 2008/0110125 A1 | 5/2008 | Pervan | DE | 10 2004 054 368 | A1 | 5/2006 |
| 2008/0134607 A1 | 6/2008 | Pervan | EP | 0 013 852 | A1 | 8/1980 |
| 2008/0134613 A1 | 6/2008 | Pervan | EP | 0 248 127 | A1 | 12/1987 |
| 2008/0134614 A1 | 6/2008 | Pervan | EP | 0 487 925 | A1 | 6/1992 |
| 2008/0295432 A1 | 12/2008 | Pervan et al. | EP | 0 623 724 | A1 | 11/1994 |
| 2009/0193748 A1 | 8/2009 | Boo et al. | EP | 0 652 340 | A1 | 5/1995 |
| | | | EP | 0 690 185 | A1 | 1/1996 |
| FOREIGN PATENT DOCUMENTS | | | EP | 0 698 162 | B1 | 2/1996 |
| | | | EP | 0 843 763 | B1 | 5/1998 |
| BE | 1010339 A3 | 6/1998 | EP | 0 849 416 | A2 | 6/1998 |
| BE | 1010487 A6 | 10/1998 | EP | 0 855 482 | B1 | 7/1998 |
| CA | 0991373 | 6/1976 | EP | 0 877 130 | B1 | 11/1998 |
| CA | 2226286 | 12/1997 | EP | 0 958 441 | | 11/1998 |
| CA | 2252791 | 5/1999 | EP | 0 661 135 | B1 | 12/1998 |
| CA | 2289309 | 7/2000 | EP | 0 903 451 | A2 | 3/1999 |
| CA | 2 363 184 A1 | 7/2001 | EP | 0 969 163 | A2 | 1/2000 |
| CA | 2 456 513 A1 | 2/2003 | EP | 0 969 163 | A3 | 1/2000 |
| CH | 200949 | 1/1939 | EP | 0 969 164 | A2 | 1/2000 |
| CH | 211877 | 1/1941 | EP | 0 969 164 | A3 | 1/2000 |
| CH | 690242 A5 | 6/2000 | EP | 0 974 713 | A1 | 1/2000 |
| DE | 1 212 275 | 3/1966 | EP | 976 889 | | 2/2000 |
| DE | 7102476 | 1/1971 | EP | 1 048 423 | A2 | 11/2000 |
| DE | 1 534 278 | 11/1971 | EP | 1 120 515 | A1 | 8/2001 |
| DE | 2 159 042 | 11/1971 | EP | 1 146 182 | A2 | 10/2001 |
| DE | 2 205 232 | 8/1973 | EP | 1 165 906 | | 1/2002 |
| DE | 7402354 | 1/1974 | EP | 1 223 265 | | 7/2002 |
| DE | 2 238 660 | 2/1974 | EP | 1 251 219 | A1 | 10/2002 |
| DE | 2 252 643 | 5/1974 | EP | 1 308 577 | A2 | 5/2003 |
| DE | 2 502 992 | 7/1976 | EP | 1 317 983 | A2 | 6/2003 |

| | | |
|---|---|---|
| EP | 1 338 344 A2 | 8/2003 |
| EP | 1 350 904 A2 | 10/2003 |
| EP | 1 350 904 A3 | 10/2003 |
| EP | 1 262 609 | 12/2003 |
| FI | 843060 | 8/1984 |
| FR | 1.138.595 | 6/1957 |
| FR | 1 293 043 | 4/1962 |
| FR | 2 256 807 | 8/1975 |
| FR | 2 568 295 | 1/1986 |
| FR | 2 630 149 | 10/1989 |
| FR | 2 637 932 A1 | 4/1990 |
| FR | 2 675 174 | 10/1992 |
| FR | 2 691 491 | 11/1993 |
| FR | 2 697 275 | 4/1994 |
| FR | 2 712 329 A1 | 5/1995 |
| FR | 2 781 513 A1 | 1/2000 |
| FR | 2 785 633 A1 | 5/2000 |
| FR | 2 810 060 A1 | 12/2001 |
| FR | 2 846 023 | 4/2004 |
| GB | 240 629 | 10/1925 |
| GB | 424057 | 2/1935 |
| GB | 585205 | 1/1947 |
| GB | 599793 | 3/1948 |
| GB | 636423 | 4/1950 |
| GB | 812671 | 4/1959 |
| GB | 1127915 | 10/1968 |
| GB | 1 171 337 | 11/1969 |
| GB | 1237744 | 6/1971 |
| GB | 1275511 | 5/1972 |
| GB | 1394621 | 5/1975 |
| GB | 1430423 | 3/1976 |
| GB | 2 051 916 A | 1/1981 |
| GB | 2117813 A | 10/1983 |
| GB | 2126106 A | 3/1984 |
| GB | 2243381 A | 10/1991 |
| GB | 2256023 A | 11/1992 |
| JP | 54-65528 | 5/1979 |
| JP | 57-119056 | 7/1982 |
| JP | 57-185110 | 11/1982 |
| JP | 59-186336 | 11/1984 |
| JP | 3-110258 A | 5/1991 |
| JP | 3-169967 | 7/1991 |
| JP | 4-106264 | 4/1992 |
| JP | 4-191001 | 7/1992 |
| JP | 05-018028 A | 1/1993 |
| JP | 5-148984 | 6/1993 |
| JP | 6-56310 | 5/1994 |
| JP | 6-146553 | 5/1994 |
| JP | 6-320510 | 11/1994 |
| JP | 7-076923 | 3/1995 |
| JP | 7-180333 | 7/1995 |
| JP | 7-300979 | 11/1995 |
| JP | 7-310426 | 11/1995 |
| JP | 8-109734 | 4/1996 |
| JP | 9-38906 | 2/1997 |
| JP | 9-88315 | 3/1997 |
| JP | 10-219975 A | 8/1998 |
| JP | 2000 179137 | 6/2000 |
| JP | P2000-226932 | 8/2000 |
| JP | 2001 173213 | 6/2001 |
| JP | 2001 179710 | 7/2001 |
| JP | 2001 254503 | 9/2001 |
| JP | 2001 260107 | 9/2001 |
| JP | P2001 329681 | 11/2001 |
| NL | 7601773 | 8/1976 |
| NO | 157871 | 7/1984 |
| NO | 305614 | 5/1995 |
| PL | 24931 U | 11/1974 |
| SE | 372 051 | 5/1973 |
| SE | 450 141 | 6/1984 |
| SE | 501 014 C2 | 10/1994 |
| SE | 502 994 | 3/1996 |
| SE | 506 254 C2 | 11/1997 |
| SE | 509 059 | 6/1998 |
| SE | 509 060 | 6/1998 |
| SE | 512 290 | 12/1999 |
| SE | 512 313 | 12/1999 |
| SE | 0000200-6 | 7/2001 |
| SU | 363795 | 11/1973 |
| SU | 1680359 A1 | 9/1991 |
| WO | WO 84/02155 | 6/1984 |
| WO | WO 87/03839 A1 | 7/1987 |
| WO | WO 92/17657 | 10/1992 |
| WO | WO 93/13280 | 7/1993 |
| WO | WO 94/01628 | 1/1994 |
| WO | WO 94/26999 | 11/1994 |
| WO | WO 96/27719 | 9/1996 |
| WO | WO 96/27721 | 9/1996 |
| WO | WO 96/30177 A1 | 10/1996 |
| WO | WO 97/19232 | 5/1997 |
| WO | WO 97/47834 | 12/1997 |
| WO | WO 98/22677 | 5/1998 |
| WO | WO 98/24994 | 6/1998 |
| WO | WO 98/24995 | 6/1998 |
| WO | WO 98/38401 A1 | 9/1998 |
| WO | WO 99/40273 A1 | 8/1999 |
| WO | WO 99/66151 | 12/1999 |
| WO | WO 99/66152 | 12/1999 |
| WO | WO 00/06854 | 1/2000 |
| WO | WO 00/20705 A1 | 4/2000 |
| WO | WO 00/20706 A1 | 4/2000 |
| WO | WO 00/47841 | 8/2000 |
| WO | WO 00/66856 | 11/2000 |
| WO | WO 01/02669 | 1/2001 |
| WO | WO 01/02672 A1 | 1/2001 |
| WO | WO 01/07729 | 2/2001 |
| WO | 01/51733 A1 | 7/2001 |
| WO | WO 01/66876 A1 | 9/2001 |
| WO | WO 01/66877 A1 | 9/2001 |
| WO | WO 01/75247 A1 | 10/2001 |
| WO | WO 01/77461 A1 | 10/2001 |
| WO | WO 01/96688 | 12/2001 |
| WO | WO 01/98603 | 12/2001 |
| WO | WO 01/98604 A1 | 12/2001 |
| WO | 02/055809 A1 | 7/2002 |
| WO | 02/055810 A1 | 7/2002 |
| WO | WO 02/060691 | 8/2002 |
| WO | WO 03/016654 | 2/2003 |
| WO | WO 03/025307 | 3/2003 |
| WO | 03/070384 A1 | 8/2003 |
| WO | 03/078761 A1 | 9/2003 |
| WO | WO 03/074814 | 9/2003 |
| WO | WO 03/083234 | 10/2003 |
| WO | WO 03/087497 A1 | 10/2003 |
| WO | WO 03/089736 | 10/2003 |
| WO | 03/099461 A1 | 12/2003 |
| WO | WO 2004/020764 A1 | 3/2004 |
| WO | WO 2004/079130 A1 | 9/2004 |
| WO | WO 2004/083557 | 9/2004 |
| WO | 2005/077625 A1 | 8/2005 |
| WO | 2005/110677 A1 | 11/2005 |
| WO | 2006/008578 A1 | 1/2006 |
| WO | 2006/111437 A1 | 10/2006 |
| WO | 2006/113757 A2 | 10/2006 |

OTHER PUBLICATIONS

Opposition II EP 0.698,162 B1—Facts-Grounds-Arguments, dated Apr. 30, 1999, (17 pages)—with translation (11 pages).
Opposition I: Unilin Decor N.V./Välinge Aluminum AB, communication dated Jun. 8, 1999 to European Patent Office, pp. 1-2.
Opposition I: Unilin Decor N.V./Välinge Aluminum AB, communication dated Jun. 16, 1999 to European Patent Office, pp. 1-2.
FI Office Action dated Mar. 19, 1998.
NO Office Action dated Dec. 22, 1997.
NO Office Action dated Sep. 21, 1998.

Opposition EP 0.877.130 B1—Facts—Arguments, dated Jun. 28, 2000, pp. 1-13.
RU Application Examiner Letter dated Sep. 26, 1997.
NZ Application Examiner Letter dated Oct. 21, 1999.
European prosecution file history to grant, European Patent No. 94915725.9-2303/0698162, grant date Sep. 17, 1998.
European prosecution file history to grant, European Patent No. 98106535.2-2303/0855482, grant date Dec. 1, 1999.
European prosecution file history to grant, European Patent No. 98201555.4-2303/0877130, grant date Jan. 26, 2000.
Communication of Notices of Intervention by E.F.P. Floor Products dated Mar. 17, 2000 in European Patent Application 0698162, pp. 1-11 with annex pp. 1-21.
Response to the E.F.P. Floor Products intervention dated Jun. 28, 2000, pp. 1-5.
Letters from the Opponent dated Jul. 26, 2001 and Jul. 30, 2001 including Annexes 1 to 3.
Communication from European Patent Office dated Sep. 20, 2001 in European Patent No. 0698162, pp. 1-2 with Facts and Submissions Annex pp. 1-18, Minutes Annex pp. 1-11, and Annex I to VI.
Communication from Swedish Patent Office dated Sep. 21, 2001 in Swedish Patent No. 9801986-2, pp. 1-3 in Swedish with forwarding letter dated Sep. 24, 2001 in English.
Välinge, "Fibo-Trespo" Brochure, Distributed at the Domotex Fair in Hannover, Germany, Jan. 1996.
Träindustrins Handbook "Snickeriarbete", 2nd Edition, Malmö 1952, pp. 826, 827, 854, and 855, published by Teknografiska Aktiebolaget, Sweden.
"Träbearbetning", Anders Grönlund, 1986, ISBN 91-970513-2-2, pp. 357-360, published by Institutet for Trateknisk Forskning, Stockholm, Sweden.
Drawing Figure 25/6107 from Buetec Gmbh dated Dec. 16, 1985.
Pamphlet from Serexhe for Compact-Praxis, entitled "Selbst Teppichböden, PVC und Parkett verlegen", Published by Compact Verlag, München, Germany 1985, pp. 84-87.
Pamphlet from Junckers Industrser A/S entitled"Bøjlesystemet til Junckers boliggulve" Oct. 1994, , Published by Junckers Industrser A/S, Denmark.
Pamphlet from Junckers Industrser A/S entitled "The Clip System for Junckers Sports Floors", Annex 7, 1994, Published by Junckers Industrser A/S, Denmark.
Pamphlet from Junckers Industrser A/S entitled "The Clip System for Junckers Domestic Floors", Annex 8, 1994, Published by Junckers Industrser A/S, Denmark.
Fibo-Trespo Alloc System Brochure entitled "Opplæring OG Autorisasjon", pp. 1-29, Fibo-Trespo.
"Revolution bei der Laminatboden-Verl", boden wand decke, vol. No. 11 of 14, Jan. 10, 1997, p. 166.
Kährs Focus Extra dated Jan. 2001, pp. 1-9.
Brochure for CLIC Laminate Flooring, Art.-Nr. 110 11 640.
Brochure for Laminat-Boden "Clever-Click", Parador® Wohnsysteme.
Brochure for PERGO®, CLIC Laminate Flooring, and Prime Laminate Flooring from Bauhaus, The Home Store, Malmö, Sweden.
Darko Pervan, U.S. Appl. No. 09/714,514 entitled "Locking System and Flooring Board" filed Nov. 17, 2000.
Darko Pervan, U.S. Appl. No. 10/768,677 entitled "Mechanical Locking System for Floorboards" filed Feb. 2, 2004.
Darko Pervan et al., U.S. Appl. No. 10/508,198 entitled "Floorboards With Decorative Grooves" filed Sep. 20, 2004.
Darko Pervan, U.S. Appl. No. 10/509,885 entitled "Mechanical Locking System for Floorboards" filed Oct. 4, 2004.
Darko Pervan, U.S. Appl. No. 10/958,233 entitled "Locking System for Floorboards" filed Oct. 6, 2004.
Darko Pervan, U.S. Appl. No. 10/510,580 entitled "Floorboards for Floorings" filed Oct. 8, 2004.
Darko Pervan, U.S. Appl. No. 10/970,282 entitled "Mechanical Locking System for Floor Panels" filed Oct. 22, 2004.
Darko Pervan, U.S. Appl. No. 10/975,923 entitled "Flooring Systems and Methods for Installation" filed Oct. 29, 2004.
Darko Pervan, U.S. Appl. No. 11/000,912 entitled "Floorboard, System and Method for Forming a Flooring, and Flooring Formed Thereof" filed Dec. 2, 2004.
Darko Pervan, U.S. Appl. No. 11/008,213 entitled "Metal Strip for Interlocking Floorboard and a Floorbaord Using Same" filed Dec. 10, 2004.
Darko Pervan, U.S. Appl. No. 11/034,059 entitled "Floor Covering and Locking System" filed Jan. 13, 2005.
Darko Pervan, U.S. Appl. No. 11/034,060 entitled "Floor Covering and Locking System" filed Jan. 13, 2005.
Darko Pervan, U.S. Appl. No. 10/906,109 entitled "Locking System and Flooring Board" filed Feb. 3, 2005.
Darko Pervan, U.S. Appl. No. 10/906,356 entitled "Building Panel With Compressed Edges and Method of Making Same" filed Feb. 15, 2005.
Jacobsson, Jan, et al., U.S. Appl. No. 11/521,439, entitled "Device and Method for Compressing an Edge of a Building Panel and a Building Panel With Compressed Edges", filed Sep. 15, 2006.
Jacobsson, Jan, U.S. Appl. No. 11/635,631, entitled "Floor Light", filed Dec. 8, 2006.
Pervan, Darko, et al., U.S. Appl. No. 11/635,674, entitled "Laminate Floor Panels", filed Dec. 8, 2006.
Pervan, Darko, et al., U.S. Appl. No. 11/635,633, entitled "Laminate Floor Panels" filed Dec. 8, 2006.
Hakansson, Niclas, U.S. Appl. No. 11/643,881, entitled "V-Groove", filed Dec. 22, 2006.
Bergelin, Marcus, et al., U.S. Appl. No. 11/649,837, entitled "Resilient Groove", filed Jan. 5, 2007.
Pervan, Darko, et al., U.S. Appl No. 11/575,600, entitled "Mechanical Locking of Floor Panels with a Flexible Tongue", filed Mar. 20, 2007.
Pervan, Darko, U.S. Appl. 11/806,478, entitled "Wear Resistant Surface", filed May 31, 2007.
Pervan, Darko, et al., U.S. Appl. No. 11/770,771, entitled "Locking System Comprising a Combination Lock for Panels", filed Jun. 29, 2007.
Pervan, Darko, et al., U.S. Appl. No. 11/775,885, entitled "Mechanical Locking of Floor Panels with a Flexible Bristle Tongue", filed Jul. 11, 2007.
Pervan, U.S. Appl. No. 12/073,447, entitled "Mechanical Locking System for Floorboards," Mar. 5, 2008.
Pervan, U.S. Appl. No. 11/822,722, entitled "Floor Covering and Laying Methods," Jul. 9, 2007.
Pervan, U.S. Appl. No. 12/051,656, entitled "Mechanical Locking System for Panels and Method of Installing Same," Mar. 19, 2008.
*Complaint, Akzenta Paneele + Profile GmbH and W. Classen GmbH & Co. KG v. Brown-West L.L.C d/b/a Carpet One Floor & Home, Shaw Industries Group, Inc. and Valinge Innovation AB*, United States District Court for the Eastern District of Texas, Marshall Division, Case No. 2:10-CV-16, dated Jan. 14, 2010.
Pervan, et al., U.S. Appl. No. 12/518,584, filed Jun. 10, 2009, entitled, "Mechanical Locking of Floor Panels".
U.S. Appl. No. 11/839,259, filed Aug. 15, 2007, Darko Pervan.
U.S. Appl. No. 12/073,447, filed Mar. 5, 2008, Darko Pervan.
U.S. Appl. No. 11/000,912, filed Dec. 2, 2004, Darko Pervan.
U.S. Appl. No. 11/822,722, filed Jul. 9, 2007, Darko Pervan.
U.S. Appl. No. 10/970,282, filed Oct. 22, 2004, Darko Pervan.
U.S. Appl. No. 11/822,681, filed Jul. 9, 2007, Darko Pervan.
U.S. Appl. No. 11/575,600, filed Dec. 7, 2007, Darko Pervan.
U.S. Appl. No. 11/889,351, filed Aug. 10, 2007, Darko Pervan.
U.S. Appl. No. 11/822,723, filed Jul. 9, 2007, Darko Pervan.
U.S. Appl. No. 11/950,085, filed Dec. 4, 2007, Darko Pervan.
U.S. Appl. No. 12/051,656, filed Mar. 19, 2008, Darko Pervan.
U.S. Appl. No. 11/775,885, filed Jul. 11, 2007, Darko Pervan.
U.S. Appl. No. 11/770,771, filed Jun. 29, 2007, Darko Pervan.
U.S. Appl. No. 11/822,710, filed Jul. 9, 2007, Darko Pervan.
U.S. Appl. No. 11/923,836, filed Oct. 25, 2007, Darko Pervan.
U.S. Appl. No. 11/952,212, filed Dec. 7, 2007, Darko Pervan.
*Answer, Affirmative Defenses and Counterclaims of Defendant Välinge Innovation AB, Akzenta Paneele + Profile GmbH and W. Classen GmbH & Co. KG v. Brown-West L.L.C d/b/a Carpet One Floor & Home, Shaw Industries Group, Inc. and Valinge Innovation AB*, United States District Court for the Eastern District of Texas, Marshall Division, Case No. 2:10-CV-00016 (TWG)(CE), dated Apr. 9, 2010.
Pervan, Darko, et al., U.S. Appl. No. 12/868,137, entitled "Mechanical Locking System For Floor Panels," filed in the U.S. Patent and Trademark Office on Aug. 25, 2010.

* cited by examiner

Fig. 6a
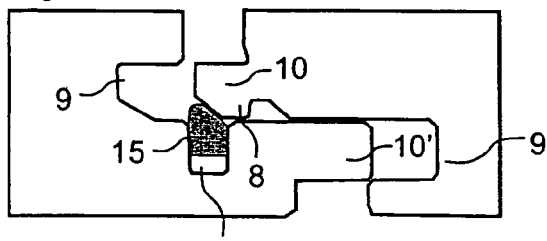
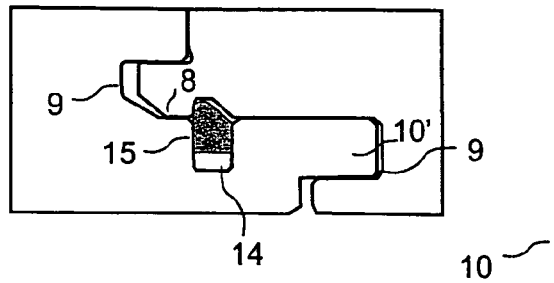
Fig. 6b
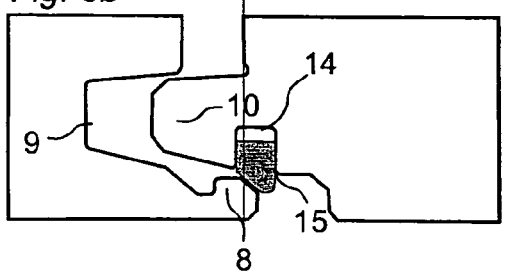
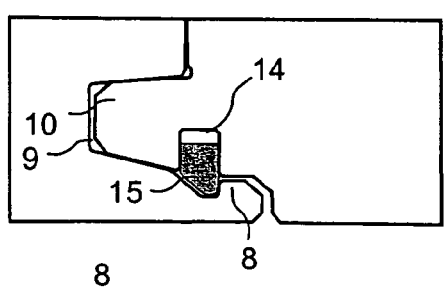
Fig. 6c
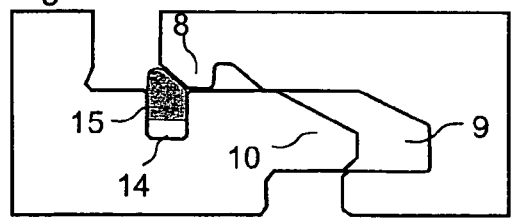
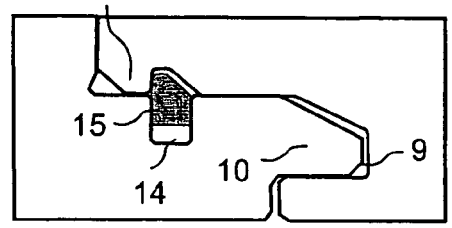
Fig. 6d
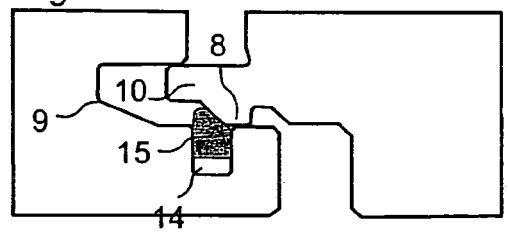
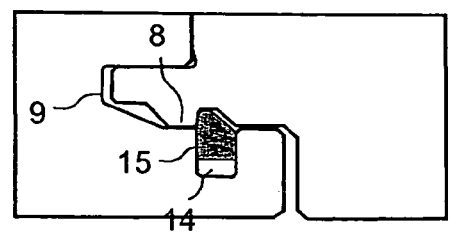
Fig. 6e
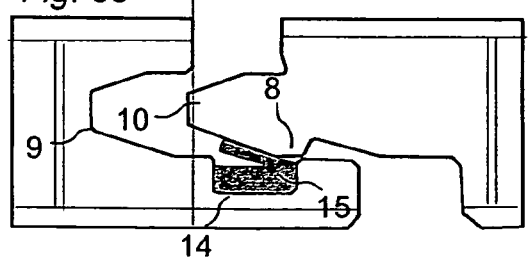
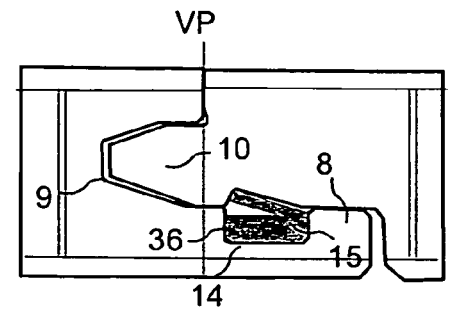

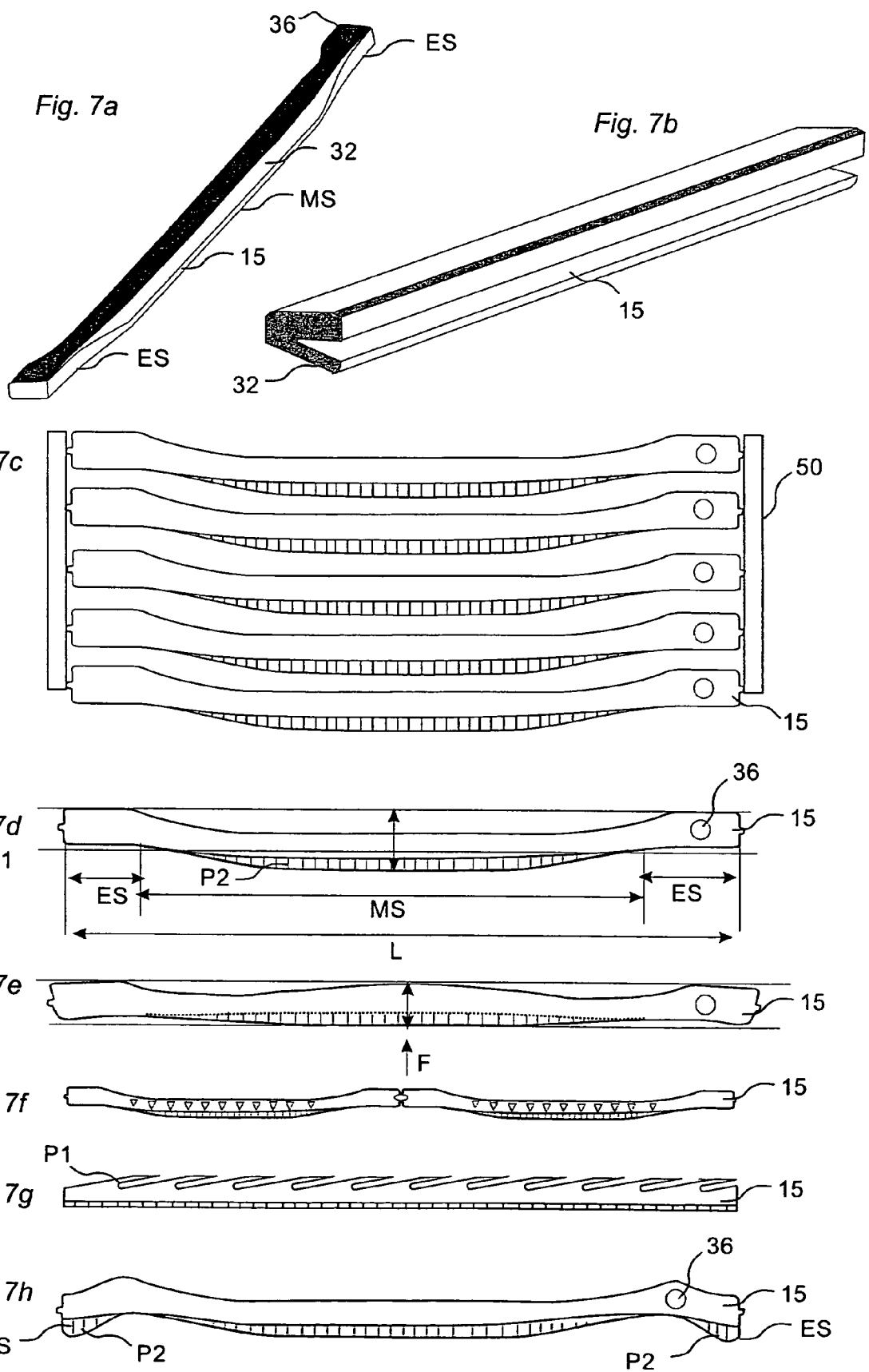

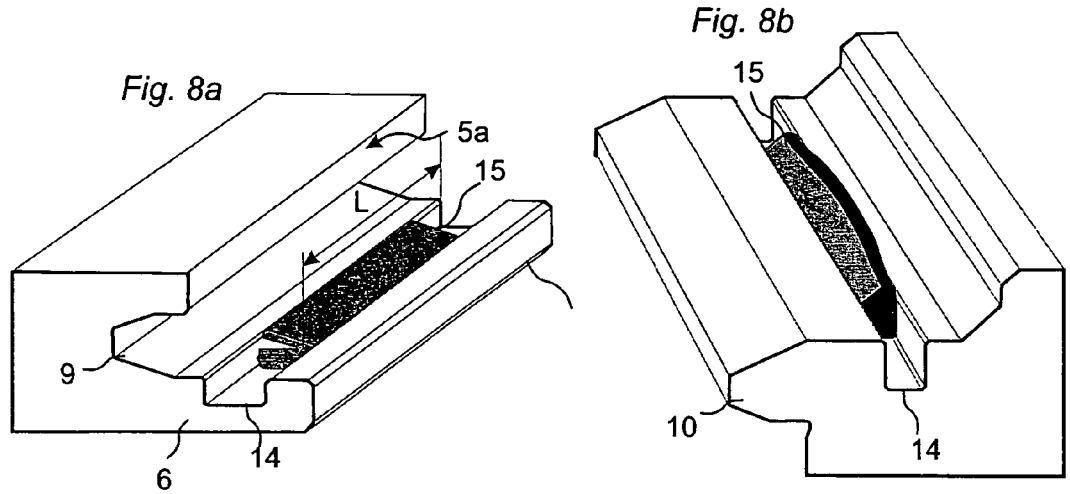
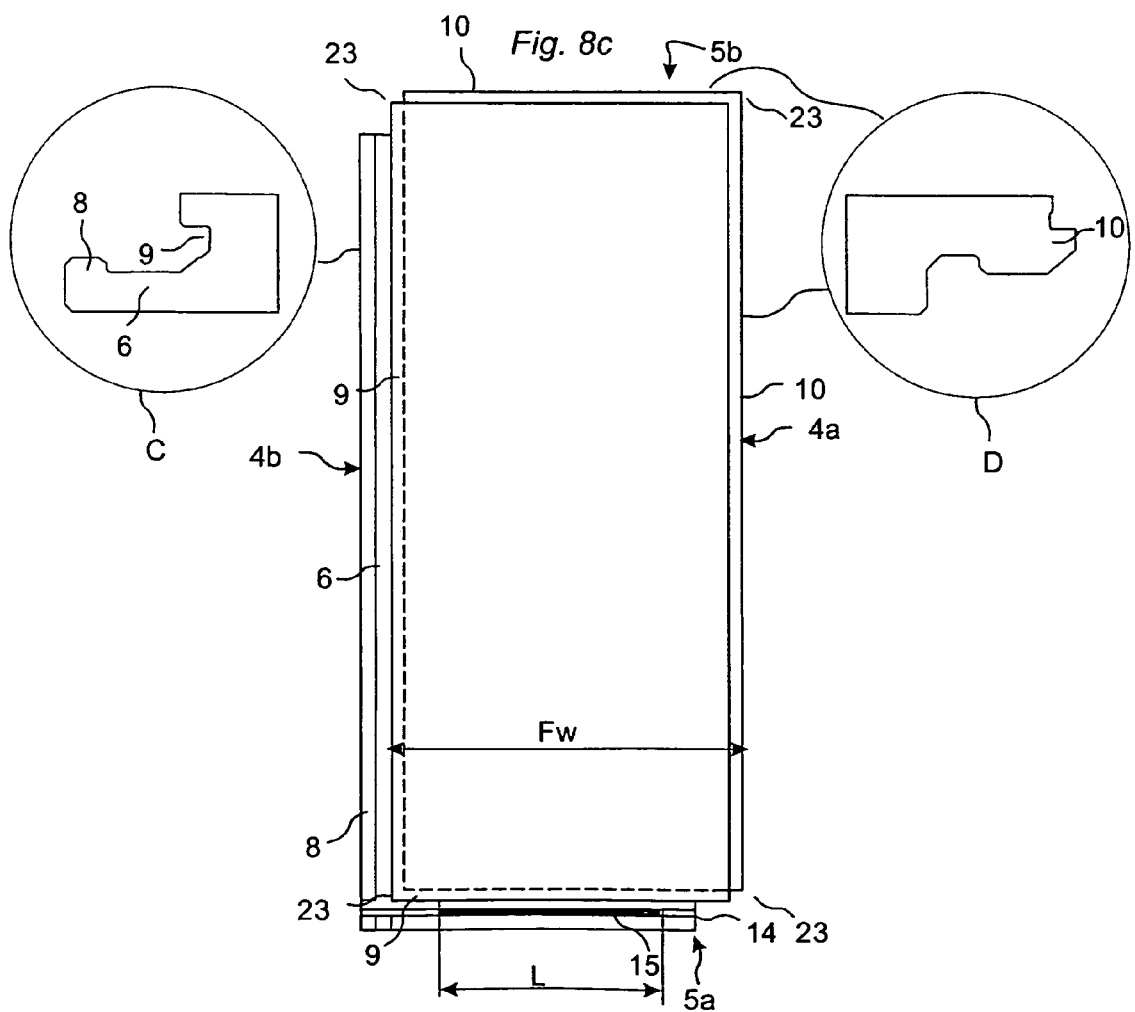

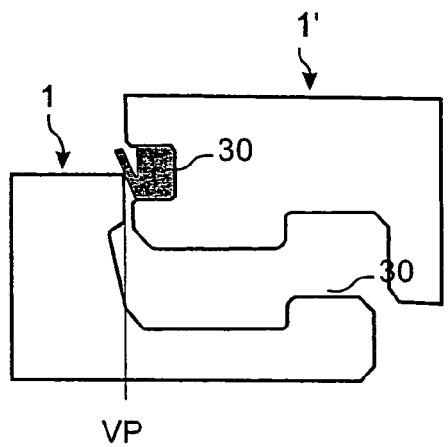
Fig. 10a
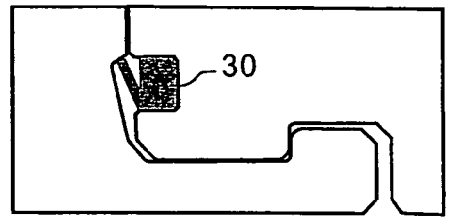
Fig. 10b
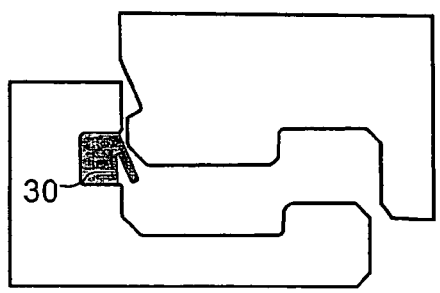
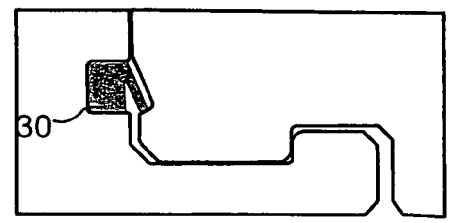
Fig. 10c
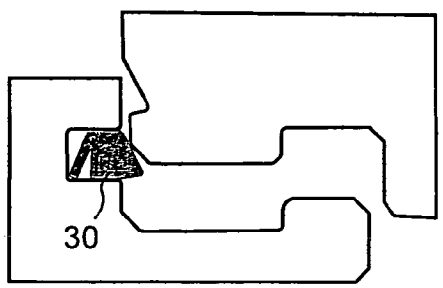
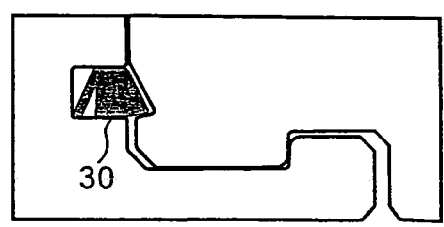
Fig. 10d
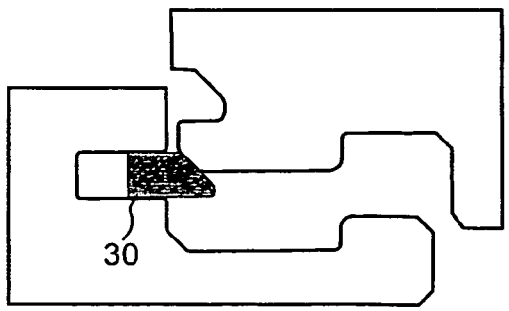
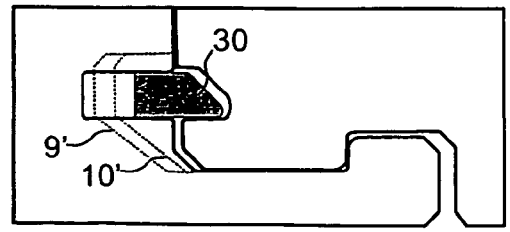

MECHANICAL LOCKING SYSTEM FOR PANELS AND METHOD OF INSTALLING SAME

TECHNICAL FIELD

The invention generally relates to the field of mechanical locking systems for floor panels and building panels.

FIELD OF APPLICATION OF THE INVENTION

The present invention is particularly suitable for use in floating floors, which are formed of floor panels which are joined mechanically with a locking system integrated with the floor panel, i.e., mounted at the factory, are made up of one or more upper layers of veneer, decorative laminate or decorative plastic material, an intermediate core of wood-fiber-based material or plastic material and preferably a lower balancing layer on the rear side of the core. The following description of known techniques, problems of known systems and objects and features of the invention will therefore, as a non-restrictive example, be aimed above all at this field of application and in particular laminate flooring formed as rectangular floor panels with long and short sides intended to be mechanically joined on both long and short sides. The long and short sides are mainly used to simplify the description of the invention. The panels could be square. It should be emphasized that the invention can be used in any panel and it could be combined with all types of known locking systems, where the floor panels are intended to be joined using a mechanical locking system connecting the panels in the horizontal and vertical directions on at least two adjacent sides. The invention can thus also be applicable to, for instance, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces such as stone, tile and similar are included and floorings with soft wear layer, for instance needle felt glued to a board. The invention can also be used for joining building panels which preferably contain a board material for instance wall panels, ceilings, furniture components and similar.

BACKGROUND OF THE INVENTION

Laminate flooring usually comprises a core of a 6-12 mm fibre board, a 0.2-0.8 mm thick upper decorative surface layer of laminate and a 0.1-0.6 mm thick lower balancing layer of laminate, plastic, paper or like material. A laminate surface comprises melamine impregnated paper. The most common core material is fibreboard with high density and good stability usually called HDF—High Density Fibreboard. Sometimes also MDF—Medium Density Fibreboard—is used as core.

Traditional laminate floor panels of this type have been joined by means of glued tongue-and-groove joints.

In addition to such traditional floors, floor panels have been developed which do not require the use of glue and instead are joined mechanically by means of so-called mechanical locking systems. These systems comprise locking systems, which lock the panels horizontally and vertically. The mechanical locking systems are usually formed by machining of the core of the panel. Alternatively, parts of the locking system can be formed of a separate material, for instance aluminium or HDF, which is integrated with the floor panel, i.e., joined with the floor panel in connection with the manufacture thereof.

The main advantages of floating floors with mechanical locking systems are that they are easy to install. They can also easily be taken up again and used once more at a different location.

DEFINITION OF SOME TERMS

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane.

By "locking systems" are meant co-acting connectors which connect the floor panels vertically and/or horizontally. By "mechanical locking system" is meant that joining can take place without glue. Mechanical locking systems can in many cases also be joined by gluing. By "integrated with" means formed in one piece with the panel or a separate material factory connected to the panel.

KNOWN TECHNIQUES AND PROBLEMS THEREOF

For mechanical joining of long sides as well as short sides in the vertical and horizontal direction (direction D1, D52) several methods could be used. One of the most used methods is the angle-snap method. The long sides are installed by angling. The panel is than displaced in locked position along the long side. The short sides are locked by horizontal snapping as shown in FIGS. 1a-1c. The vertical connection is a tongue 10 and a groove 9 during the horizontal displacement, a strip 6 with a locking element 8 is bent and when the edges are in contact, the strip springs back and a locking element 8 enters a locking groove 14 and locks the panels horizontally. The vertical displacement of the locking element during the snapping action is caused by the bending of the strip. Such a snap connection is complicated since a hammer and a tapping block is frequently used to overcome the friction between the long edges and to bend the strip during the snapping action. The friction on the long side could be reduced and the panels could be displaced without tools. The snapping resistance is however considerable, especially in locking systems made in one piece with the core. Wood based materials are generally difficult to bend. Cracks in the panel may occur during snapping and the locking element must be rather small in the vertical direction in order to allow snapping.

It is known that a snap system could have a separate plastic strip 6', integrated with the panel and with a resilient part as shown in FIGS. 1d-1f. Such a locking system could be locked with less resistance than the traditional one-piece snap system. This locking system has however several disadvantages. The plastic strip is used to replace both the tongue and the strip with a locking element. The material cost is therefore high and the locking system is generally not compatible with the locking system used in old panels. The groove 9 is difficult to produce since it must have a locking element 8'. In fact 4 locking elements, two flexible locking elements on the strip and two (8,8') in the panel, must be used to lock in the horizontal direction. It is difficult to fix the plastic strip over the whole length of the short side. This means that corner portions will not have any tongue and this could cause problems in some applications.

SUMMARY AND OBJECTS

A first overall objective of the present invention is to provide a locking system, which could be locked by horizontal snapping and with less snapping resistance than the known systems. The costs and functions should be favourable compared to known technology. An aspect of the overall objective is to improve the function and costs of those parts of the locking system that locks in the horizontal direction when panels are pushed against each other.

More specifically an object is to provide a snap locking system where one or several of the following advantages are obtained.

The floor panel should preferably be possible to displace and lock with such a low force that no tools will be needed.

The locking function should be reliable and the vertical and horizontal locking should be strong and prevent that two locked panels will move when humidity is changing or when people walk on a floor.

The locking system should be able to lock floor panels vertically with high precision so that the surfaces are essentially in the same plane.

The locking system should be designed in such a way that the material and production costs could be low.

Another objective is to provide a snap locking system which could be compatible with traditional locking systems.

According to a first embodiment, a flooring system is provided, comprising a plurality of rectangular floor panels with long and short edges, which are mechanically connectable to each other along one pair of adjacent edges. The floor panels are provided with tongue and groove formed in one piece with the panels for mechanically locking together said one pair of adjacent edges at right angles to the principal plane of the panels, thereby forming a vertical mechanical connection between the panels. The panels are provided with a first locking element at one first edge formed in one piece with the panel and a locking groove at an opposite adjacent second edge, the locking groove being open towards a rear side or a front side of the panel. Each panel is provided with a second locking element, formed of a separate material and connected to the locking groove. The first and second locking elements form a mechanical connection locking the panels to each other horizontally parallel to the principal plane and at right angles to the joint edges. The second locking element is flexible and resilient such that two panels, can be mechanically joined by displacement of said two panels horizontally towards each other, while at least a part of the second locking element at said second edges is resiliently displaced vertically, until said adjacent edges of the two panels are brought into engagement with each other horizontally and the second locking element at said second edge is displaced towards its initial position against the first locking element at the first edge.

Although it is an advantage to integrate the flexible locking element with the panel at the factory, the invention does not exclude an embodiment in which flexible locking elements are delivered as separate components to be connected to the panel by the installer prior to installation.

The embodiment allows horizontal and vertical locking of all sides of floor panels with for instance an angling of the long sides, a simple horizontal displacement along the long sides and snapping of the short sides. In this preferred embodiment the flexible locking element is on the short sides. It could be on the long side or on the long and short sides.

The invention is especially suited for use in floor panels, which are difficult to snap for example because they have a core, which is not flexible, or strong enough to form a strong snap locking system. The invention is also suitable for wide floor panels, for example with a width larger than 20 cm, where the high snapping resistance is a major disadvantage during installation, in panels where parts of the locking system is made of a material with high friction, such as wood and in locking systems which are produced with tight fit or without play or even with pretension. Especially panels with such pretension where the locking strip is bent in locked position and presses the panels together are very difficult to displace and snap. A locking system that reduces the snapping resistance will decrease the installation time of such panels considerably.

BRIEF DESCRIPTION OF THE DRAWINGS

FIGS. 6a-e show embodiments of the invention.

FIGS. 7a-h show different embodiments of a flexible locking element.

FIGS. 8a-8c show locking systems on long and short sides according to embodiments of the invention.

FIGS. 10a-d show how the flexible locking element could be used as a flexible tongue enabling a vertical connection according to embodiments of the invention.

DESCRIPTION OF EMBODIMENTS OF THE INVENTION

To facilitate understanding, several locking systems in the figures are shown schematically. It should be emphasised that improved or different functions can be achieved using combinations of the preferred embodiments. The inventor has tested all known and especially all commercially used locking systems on the market in all types of floor panels, especially laminate and wood floorings and the conclusion is that at least all these known locking systems which have one or more locking elements cooperating with locking grooves could be adjusted to a system with one or more flexible locking elements according to the invention. Most of them could easily be adjusted in such a way that they will be compatible with the present systems. Several flexible locking elements could be located in both adjacent edges, one over the other or side-by-side. The flexible locking element could be on long and/or short sides and one side with a flexible locking element could be combined with an other side which could have all known locking systems, preferably locking systems which could be locked by angling or a vertical movement. The invention does not exclude floor panels with flexible locking elements on for example a long and a short side. Such panels could be installed by the known snap—snap installation methods. A preferred embodiment is a floorboard with a surface layer of laminate, a core of HDF and a locking system with a flexible locking element on the short side allowing easy snapping combined with a one piece mechanical locking system on long side which could be locked by angling. The long side locking system could have a small play of some 0.01 mm between at least some surfaces which are active in the vertical or horizontal locking such as tongue/groove and or locking element/locking groove. This small play facilitates displacement. Such a floorboard will be very easy to install with angling and snapping. Angles, dimensions, rounded parts etc are only examples and could be adjusted within the principles of the invention.

A first preferred embodiment of a floor panel 1, 1' provided with a mechanical locking system according to the invention is now described with reference to FIGS. 2a-2b.

Figure 1A:
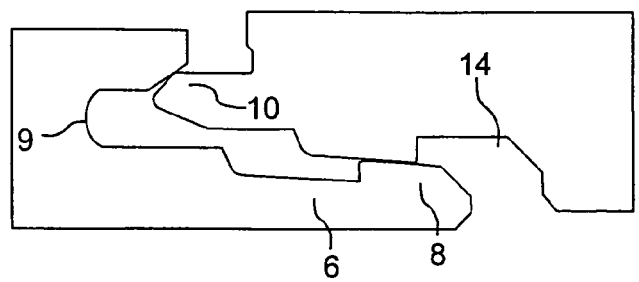
FIGS. 1a-f illustrate known systems.
Figure 1B:
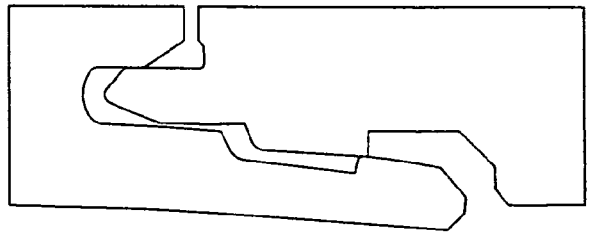
Figure 1C:
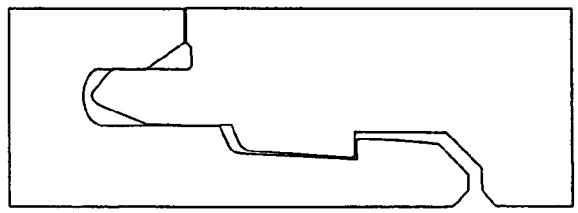
Figure 1D:
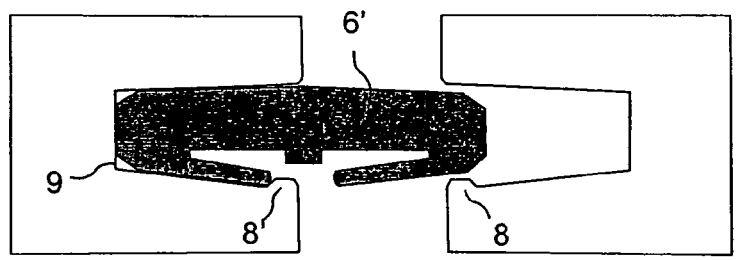
Figure 1E:
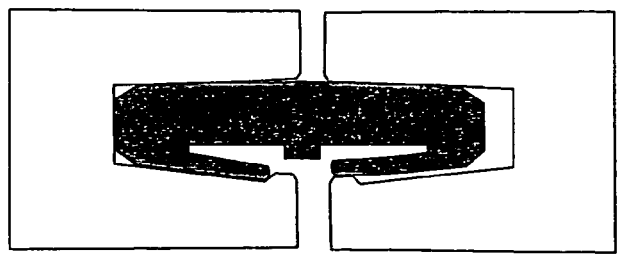
Figure 1F:
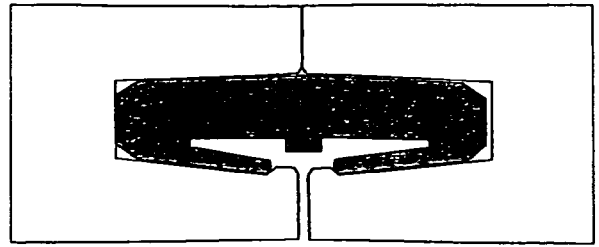
Figure 2A:
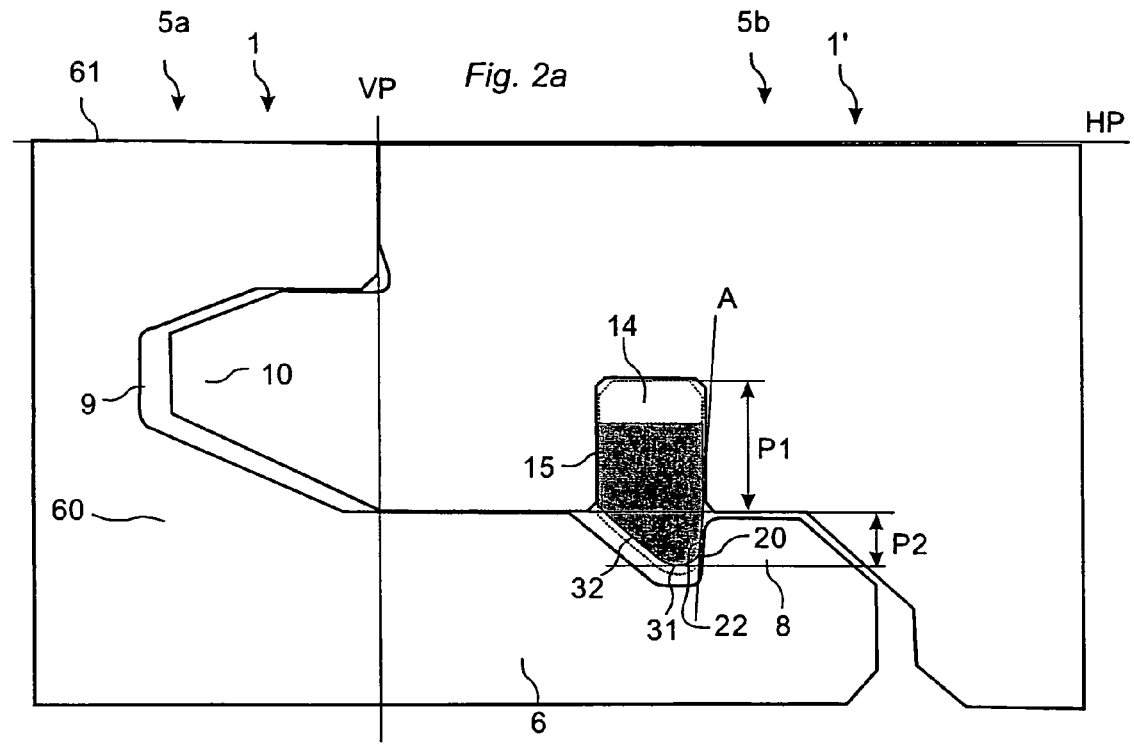
FIGS. 2a-b Illustrate two embodiments of the invention

FIG. 2a illustrates schematically a cross-section of a joint preferably between a short side joint edge 5a of a panel 1 and an opposite short side joint edge 5b of a second panel The front sides 61 of the panels are essentially positioned in a common horizontal plane HP, and the upper parts of the joint edges 5a, 5b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have a locking strip 6 with a first locking element 8, and a groove 9 made in one piece with the panel in one joint edge 5a and a tongue 10 made in one piece with the panel at an opposite edge 5b. The tongue 10 and the groove 9 and provide the vertical locking D1.

The mechanical locking system comprises a separate flexible second locking element 15 connected into a locking groove 14 formed in the opposite edge 5b of the panel. Parts of the flexible locking element could bend in the length direction and could be displaced in the locking groove. The flexible locking element 15 has a groove portion P1 that is located in the locking groove 14 and a projecting portion P2 projecting outside the locking groove 14. The projecting portion P2 of the second flexible locking element 15, made of a separate material, in one of the joint edges cooperates with a first locking element 8 made in one piece with the panel and formed in the other joint edge.

In this embodiment, the panel 1 could for example have a body or core 60 of wood-fibre-based material such as HDF, plywood or solid wood. The panels 1, 1' could also be made of stone, metal or ceramic materials. These materials are not flexible. The tongue 10 and/or the strip 6 with the locking element 8 could also be made of a separate material connected to the panel.

The flexible locking element 15 has a protruding part P2 with a rounded outer part 31 and a sliding surface 32 which in this embodiment is formed like a bevel.

The first locking element 8 has a first locking surface 20 which cooperates with a second locking surface 22 of the second flexible locking element 15 and locks the joint edges 5a, 5b in a horizontal direction D2. In this embodiment, the locking surfaces 20, 22 are slightly angled (A) against the vertical plane VP. The second locking element 15 will therefore lock as a wedge and tolerances could be eliminated with vertical pre-tension caused by the vertical flexibility of the second flexible locking element.

Figure 2B:
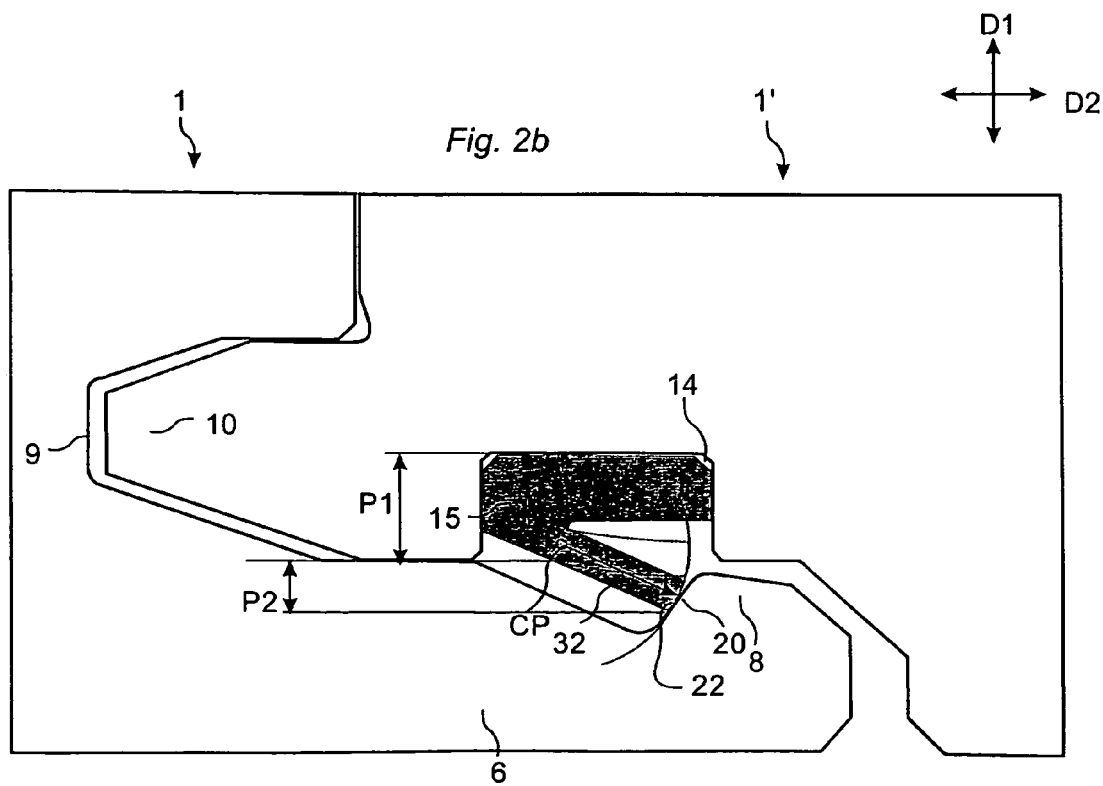

FIG. 2b shows another embodiment. The inner part P1 of the flexible locking element 15 is fixed in the locking groove 14 and the protruding part P2 could flex vertically towards the locking groove 14 and the inner part P1 and back again towards the first locking element. In this embodiment the bending of the protruding part P2 takes place around a center point CP. The locking surfaces 20, 22 are formed such that they meet each other when the protruding part P2 snaps back towards its initial position.

Figure 3A:
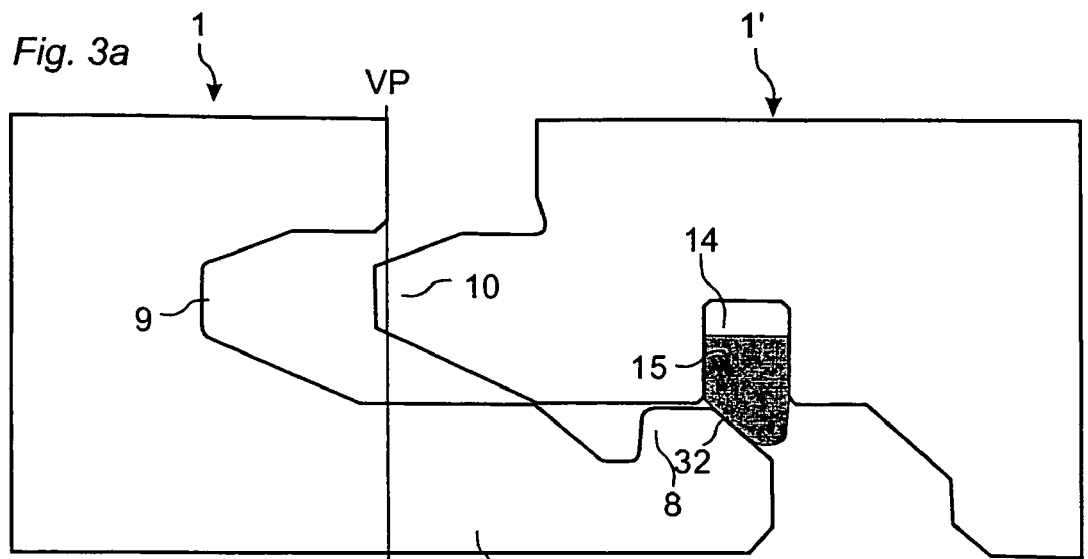
FIGS. 3a-c illustrate in several steps mechanical joining of floor panels according to an embodiment of the invention.
Figure 3B:
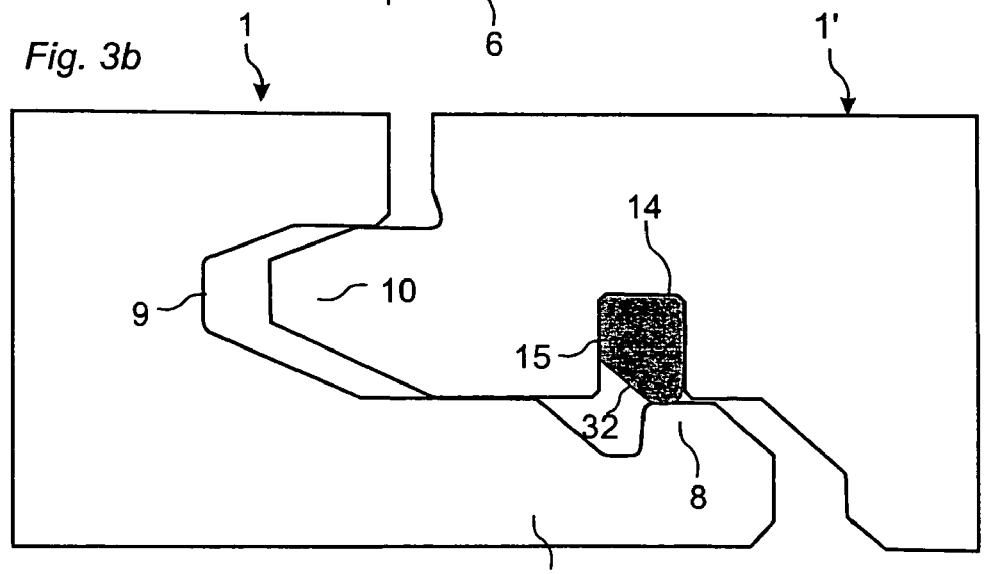
Figure 3C:
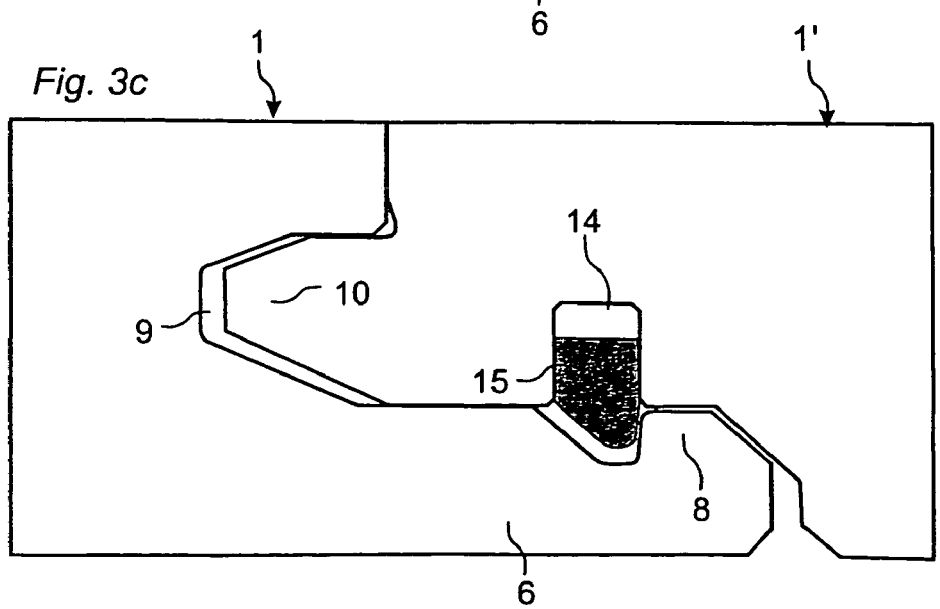

FIGS. 3a-3c show how the flexible locking element 15 is displaced in the locking groove 14. The flexible locking element 15 is displaced vertically when the displacement surface 32 presses against the bevelled part of the first locking element 8 as shown in FIG. 3a. When the top edges of the panels 1, 1' are in contact or in the intended locked position, the flexible locking element 14 springs back and locks to the first locking element 8 as shown in FIG. 3c.

Figure 4A:
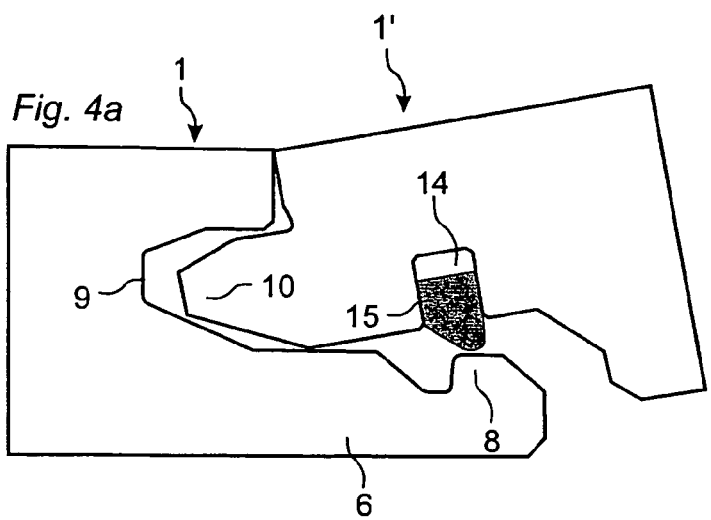
FIGS. 4a-d illustrate in several steps mechanical locking and unlocking of floor panels according to an embodiment of the invention.
Figure 4B:
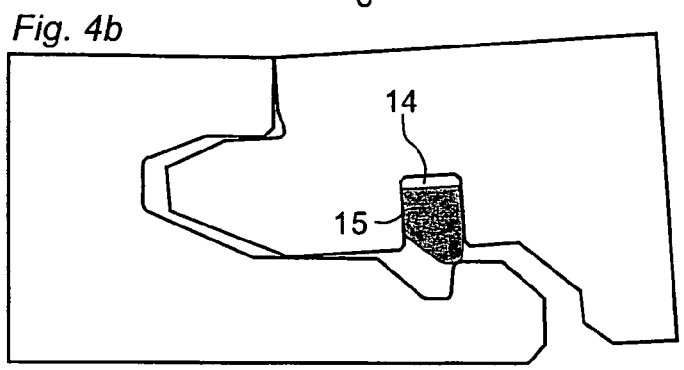
Figure 4C:
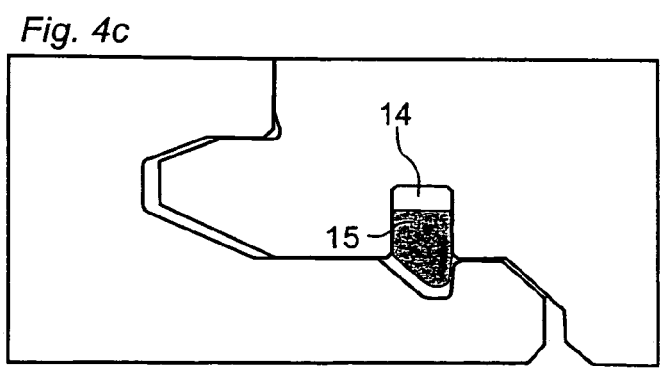
Figure 4D:
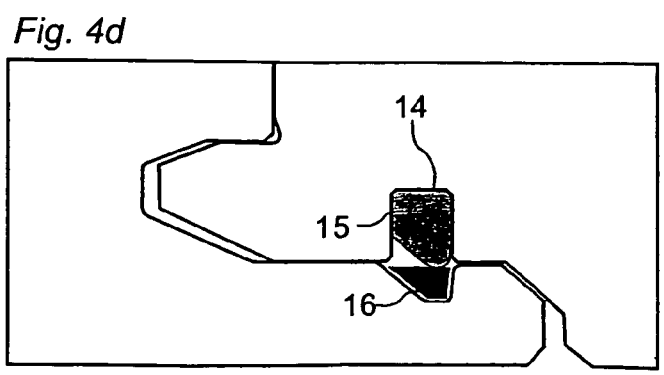

FIGS. 4a-4c show that a locking system with a flexible locking element 15 could also be locked and unlocked with angling. FIG. 4d shows that a locking system with a flexible locking element could be unlocked with a needle shaped tool 16, which is inserted along the joint edge to push back the flexible locking element 14 and to unlock the locking system. Such an unlocking could be used to unlock panels which are installed in a herringbone pattern long side to short side with angling of short sides and snapping of short sides to long side.

Figure 5A:
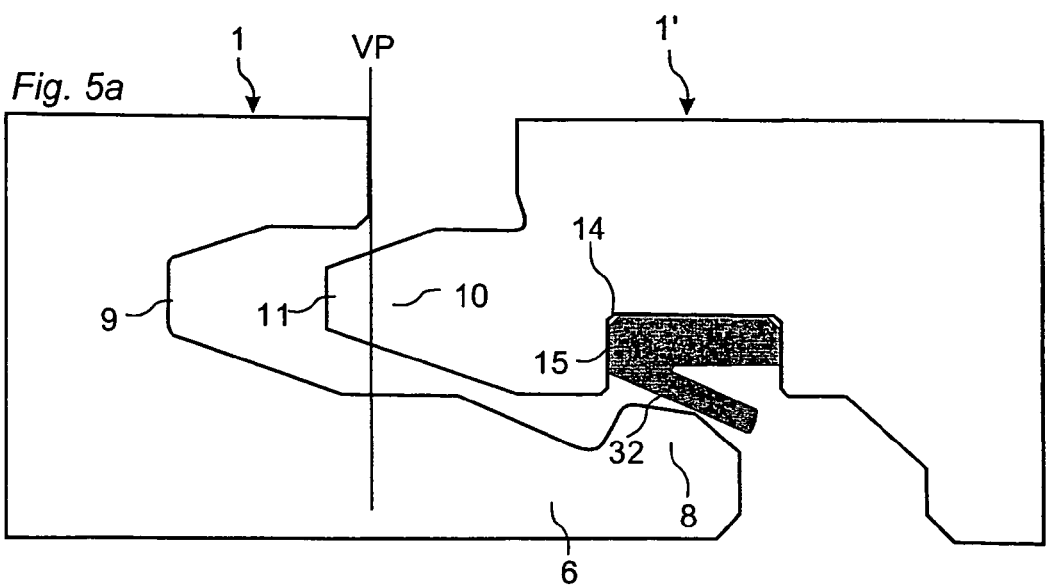
FIGS. 5a-c illustrate in several steps mechanical locking of floor panels according to another embodiment of the invention.
Figure 5B:
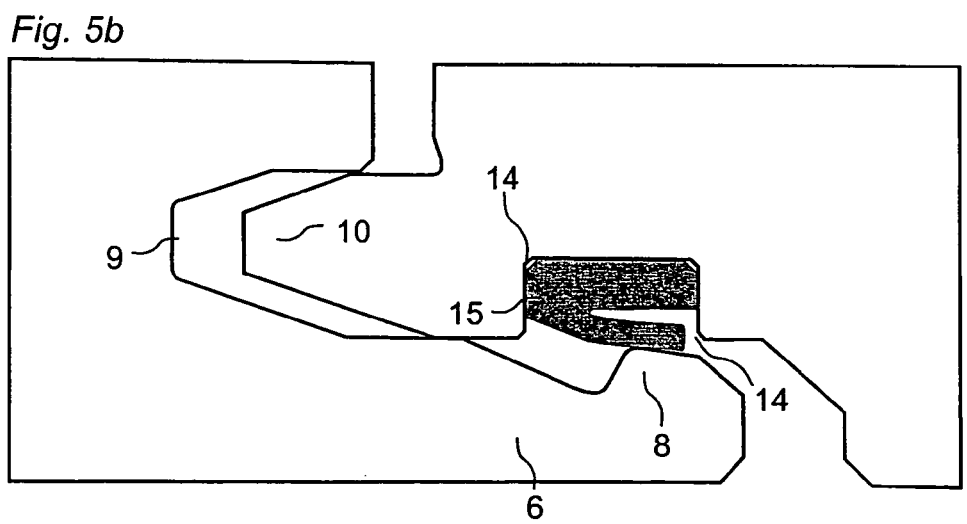
Figure 5C:
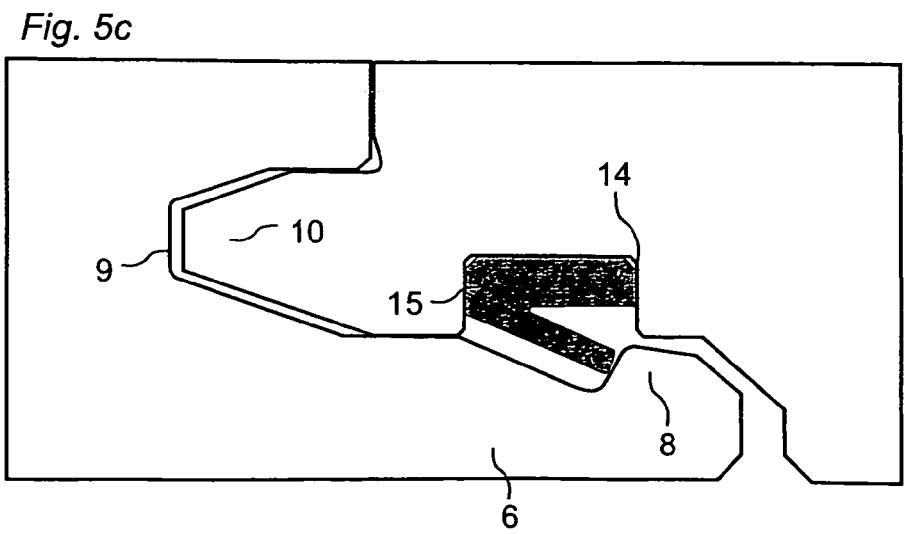
Figure 9A:
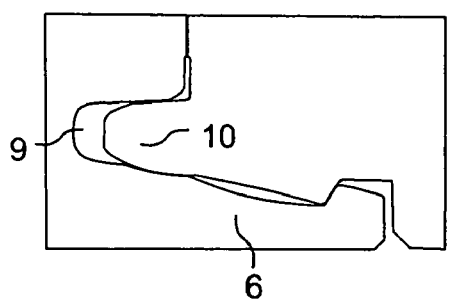
FIGS. 9a-i show how known locking systems could be converted to a locking system according to an embodiment of the invention.
Figure 9D:
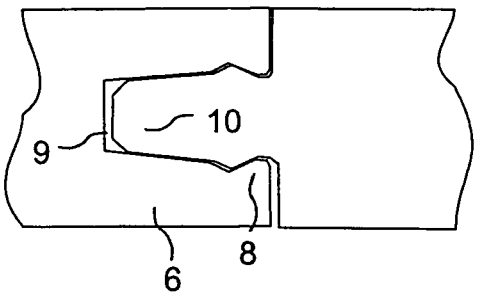
Figure 9B:
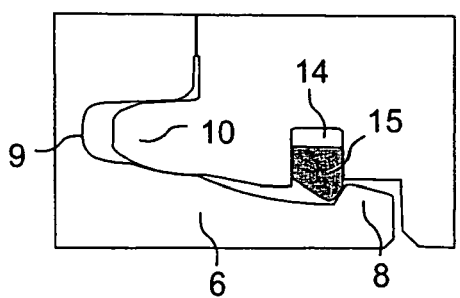
Figure 9E:
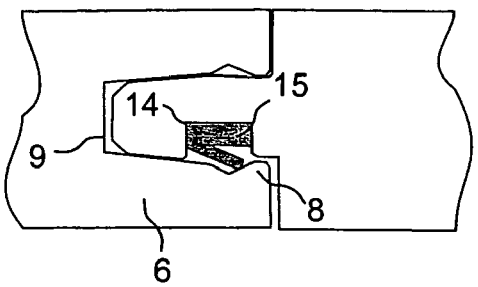
Figure 9C:
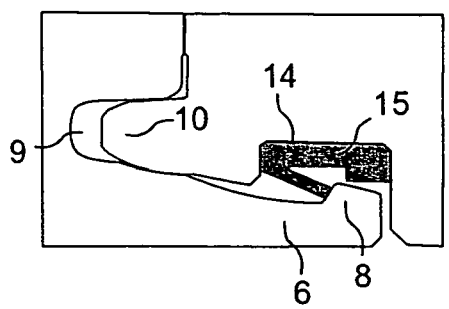
Figure 9F:
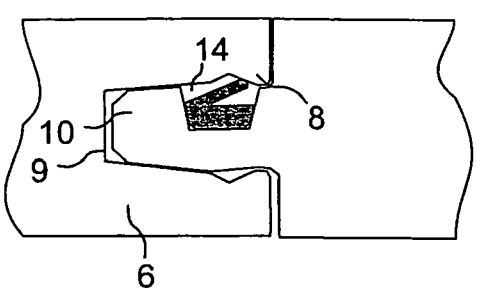
Figure 9G:
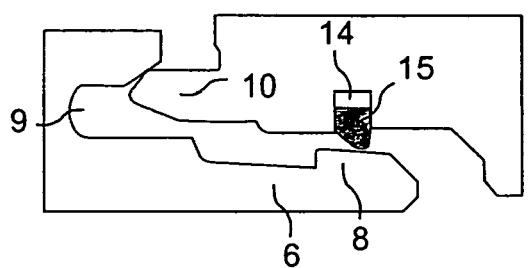
Figure 9H:
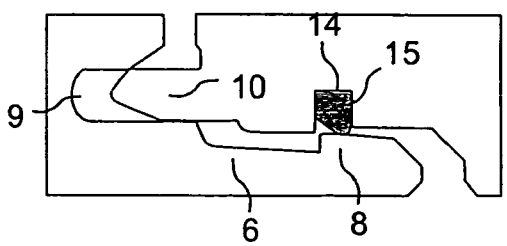
Figure 9I:
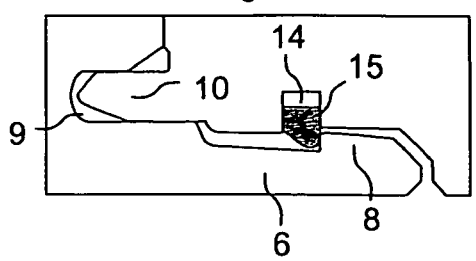

FIGS. 5a-5c show locking according to the embodiment in FIG. 2b. It is an advantage if the tip 11 of the tongue 10 is partly in the groove 9 when the sliding surface 32 is in contact with the locking element 8. This facilitates snapping and installation of the panels.

FIGS. 6a-6e show different embodiments of the invention. FIG. 6a shows a system with two tongues 10,10' and with a locking groove 14 open towards the front side. FIG. 6b shows a system with the locking groove partly in the part of the tongue 10 which is outside the vertical plane VP. FIGS. 6c and 6d are similar to 6a but these systems have only one tongue. FIG. 6e shows an embodiment according to FIG. 2b but with the locking groove open towards the front side. In this embodiment the floor panel is a parquet floor with a surface layer of wood and a lamella core. The flexible locking element 14 has a protrusion 36 to increase the friction between the flexible locking element 15 and the locking groove 14.

The flexible locking element 15 should preferably be connected to the locking groove with high precision, especially when parts of the flexible locking element 15 are displaced in the locking groove 14 during locking. Depending on the compressibility and friction between the flexible locking element and the locking groove, the flexible locking element as whole or different parts could be connected with a small play, for example 0.01-0.10 mm, a precise fit or a pretension. Wax or other friction reducing materials or chemicals could be applied in the locking groove and/or between the locking elements.

Even with a play, a precise fit between the upper joint edges could be accomplished. The protruding part P2 could be formed to press against the locking surface 20 of the locking element 8. For example the protruding part P2 could be formed with a small angle to the vertical plane VP. The protruding part P2 of the flexible tongue will tilt and press the edges together. The flexible locking element 15 could be formed to cause a permanent pressure force vertically in the locked position. This means that the flexible locking element 15 will only partly spring back to the initial position. The flexible locking element could optionally be designed with such dimensions that after locking it will move slightly towards its initial position. Gradually a perfect connection will be accomplished.

FIGS. 7a-7h shows different embodiments of the flexible locking element 15. In FIG. 7a the flexible locking element 15 is moulded and has on one of the edge sections ES a friction connection 36 which could be shaped for instance as a local small protrusion. This friction connection keeps the flexible locking element in the locking groove 14 during installation, or during production, packaging and transport, if the flexible locking element is integrated with the floor panel at the factory. In FIG. 7b the flexible locking element 15 is an extruded plastic section.

FIG. 7c shows a blank 50 consisting of several flexible locking elements 15 connected to each other. In this embodiment the flexible locking element 15 is made with moulding, preferably injection moulding.

Any type of polymer materials could be used to produce the flexible locking elements such as PA (nylon), POM, PC, PP, PET or PE or similar materials having the properties described above in the different embodiments. These plastic materials could be reinforced with for instance glass fibre. A preferred material is glass fiber reinforced PA.

FIGS. 7d and 7e show a flexible locking element 15 with a length L, middle section MS and edge sections ES. This flexible locking element could bend in the length direction and the protruding part P2 could be displaced vertically in the locking groove if a force F is applied to the protruding part P2. FIG. 7f shows a double tongue 15. FIG. 7g shows an extruded section with a resilient punched inner part P1. FIG. 7h shows a flexible tongue 15 with protruding parts P2 at the edge sections ES.

With these production methods and basic principles a wide variety of complex two and three-dimensional shapes could be produced at low cost. Of course the flexible locking element 15 could be made from metal, preferably aluminium, but wood based sheet material such as HDF and compact laminate could also be used to form flexible locking elements with machining and punching and in combination with for example flexible rubber materials or similar.

FIGS. 8a-8c show how the flexible locking element 15 is connected to a groove 14 at a short side 5a of a floor panel. FIG. 8a shows an embodiment with a flexible tongue as shown in FIG. 7b and FIG. 8b shows an embodiment according to FIG. 7a. FIG. 8c shows a floor panel with a flexible locking element on the short sides 5a, 5b and an angling system C, D on the long sides 4a, 4b. Of course the long sides can also have one or several flexible locking elements. The flexible locking element 15 has in this embodiment a length L that is smaller than the width FL of the floor panel. As a non-restricting example it could be mentioned that sufficient locking strength could be achieved with a flexible locking element with a length L which is smaller than 0.8 times the floor width FW. Even a length L of 0.5 times FW could be sufficient. Such a flexible locking element could have a weight of about 1 gram and the material cost could be considerably lower than for other known technologies where separate materials are used. It is also very easy to connect to the locking element since it is not very important that the flexible locking element is connected at a precise distance from the corner portions 23. A further advantage is that the tongue 10 extends along essentially the whole short side as in traditional floor panels. This gives a strong vertical connection especially at the corner portions 23. Of course the flexible locking element could cover essentially the whole width FW.

The flexible locking element could be connected to the locking groove in several ways. A preferable method is that the flexible locking element is mechanically fixed. Of course glue or mechanical devices can also be used. To simplify the understanding the panel is located with its rear side up and the flexible locking element is on the short side. The panel could also be turned with the front side up. The flexible locking element is separated from blanks 50, if it is moulded, or from rolls if is extruded. It is then pressed or rolled into the locking groove when a short side of the panel is displaced under a fixing unit and the locking element is connected with friction.

A lot of alternatives are possible within the main principles that the flexible locking element is separated and fixed with a friction force.

FIGS. 9a to 9i are examples which show that known locking systems, especially traditional snap systems with a bendable strip (9a-9c or 9g-9i) or lip 6 9d-9f) could be adjusted to a snap system with a flexible locking element 14 according to the invention. Generally only a simple adjustment of the locking groove is necessary. It could be made in the same machine and with the same number of cutting tools.

FIGS. 10a-10d show that the principles used in a locking system with a flexible locking element could also be used to replace the tongue 10 with a flexible tongue 30 in order to provide a locking system, which could be locked by vertical folding. One panel 1' could be moved along the vertical plane VP vertically towards another panel 1. The flexible tongue 30 is in this case displaced horizontally according to the same principles as described for the flexible locking element and all embodiments of the flexible locking element could be used. Of course the flexible locking element could be combined with a flexible tongue. Such a locking system could be locked with angling, snapping and vertical folding. FIG. 10d shows that it is an advantage if the flexible tongue 30 on a short side is positioned between the upper and lower parts of the tongue 10' and groove 9' on the long sides. This gives a stronger locking at the corner portions.

Within the invention a lot of alternatives are possible to accomplish snapping with a flexible locking element.

All features of the embodiment described above could be combined with each other or used separately. They could be used on long and/or short sides. The method to produce a separate locking element, which is inserted into a groove, could of course be used to improve friction properties and strength even if the locking element is not flexible or displaceable in the vertical direction. The methods and principles could also be used together with a flexible tongue that could be bent in horizontal direction during locking. The flexible locking element could also be combined with a strip 6 or lip which is partly bent during snapping. The degree of such a bending could be considerable smaller than in present known systems.

The system could be used to connect tile shaped panels installed on a wall. The tiles could be connected to each other and to a locking member fixed to the wall.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

The invention claimed is:

1. A flooring system, comprising a plurality of rectangular floor panels with long and short edges which are mechanically connectable to each other along one pair of adjacent edges, said floor panels each being provided with a tongue and groove formed in one piece with the panels for mechanically locking together said adjacent edges at right angles to the principal plane of the panels, thereby forming a vertical mechanical connection between the panels, said panels being provided with a first locking element at one first edge formed in one piece with the panel and a locking groove at an opposite second edge, the locking groove being open towards a rear side or a front side of the panel, the second edge further comprising a locking element groove adjacent the locking groove, the locking element groove including a bottom, each panel being provided with a second locking element, formed of a separate material, wherein the second locking element has a groove portion that is located in the locking element groove of the same edge, and a projecting portion that is located outside the locking element groove, and wherein the projecting portion is located outside the locking element groove prior to engagement between the panels, and a space exists between the bottom of the locking element groove and the protecting portion prior to engagement between the panels, the first and second locking elements form a mechanical connection locking the panels to each other horizontally parallel to the principal plane and at right angles to the joint edges, the second locking element is flexible and resilient such that two panels, can be mechanically joined by displacement of said two panels horizontally towards each other, while at least a part of the second locking element at said second edge is resiliently displaced vertically into the space, until said adjacent edges of the two panels are brought into engagement with each other horizontally and the second locking element at said second edge is displaced towards its initial position against the first locking element at the first edge, wherein a location and a shape of the second locking element accommodates said mechanical joining by displacement of said two panels horizontally towards each other.

2. The flooring system as claimed in claim 1 wherein the locking groove is open towards the rear side.

3. The flooring system as claimed in claim 1, wherein the locking groove is open towards the front side.

4. The flooring system as claimed in claim 1, wherein the first locking element is on a locking strip which is an extension of the lower part of the groove.

5. The flooring system as claimed in claim 1 wherein the groove portion and the projecting portion are displaced towards each other when the panels are displaced horizontally.

6. The flooring system as claimed in claim 1, wherein the displacement of the second locking element is not effected until a part of the tongue is in the groove.

7. The flooring system as claimed in claim 1, wherein a part of the second locking element is displaced in the locking element groove.

8. A flooring system as claimed in claim 7, wherein the second locking element along its length has at least two sections and the displacement of one of the sections is larger than the displacement of the other one of the sections.

9. The flooring system as claimed in claim 1, wherein said projecting portion in a connected state is located outside the locking element groove, wherein the size of said projecting portion and/or the groove portion varies along the length of the flexible locking element.

10. The flooring system as claimed in claim 1, wherein the second locking element is made of polymer material.

11. A flooring system, comprising a plurality of rectangular floor panels with long and short edges which are mechanically connectable to each other along one pair of adjacent edges, said floor panels each being provided with a tongue and groove formed in one piece with the panels for mechanically locking together said adjacent edges at right angles to the principal plane of the panels, thereby forming a vertical mechanical connection between the panels, said panels being provided with a first locking element at one first edge formed in one piece with the panel and a locking groove at an opposite second edge, the locking groove being open towards a rear side or a front side of the panel, the second edge further comprising a locking element groove adjacent the locking groove, the locking element groove including a bottom, each panel being provided with a second locking element, formed of a separate material and connected to the locking element groove, and a space exists between the bottom of the locking element groove and a portion of the second locking element prior to engagement between the panels, the first and second locking elements form a mechanical connection locking the panels to each other horizontally parallel to the principal plane and at right angles to the joint edges, the second locking element is flexible and resilient such that two panels, can be mechanically joined by displacement of said two panels horizontally towards each other, while at least the portion of the second locking element at said second edge is resiliently displaced vertically into the space, until said adjacent edges of the two panels are brought into engagement with each other horizontally and the second locking element at said second edge is displaced towards its initial position against the first locking element at the first edge, wherein the flexible locking element is spaced from a corner portion.

12. The method of claim 11, wherein the second locking element is made of polymer material, and wherein the second locking element is made of a moulded or extruded polymer material reinforced with glass fiber.

13. The flooring system as claimed in claim 11, wherein a location and a shape of the second locking element accommodates said mechanical joining by displacement of said two panels horizontally towards each other.

14. A flooring system, comprising a plurality of rectangular floor panels with long and short edges which are mechanically connectable to each other along one pair of adjacent edges, said floor panels each being provided with a tongue and groove formed in one piece with the panels for mechanically locking together said adjacent edges at right angles to the principal plane of the panels, thereby forming a vertical mechanical connection between the panels, said panels being provided with a first locking element at one first edge formed in one piece with the panel and a locking groove at an opposite second edge, the locking groove being open towards a rear side or a front side of the panel, the second edge further comprising a locking element groove adjacent the locking groove, the locking element groove including a bottom, each panel being provided with a second locking element, formed of a separate material and connected to the locking element groove, and a space exists between the bottom of the locking element groove and a portion of the second locking element prior to engagement between the panels, the first and second locking elements form a mechanical connection locking the panels to each other horizontally parallel to the principal plane and at right angles to the joint edges, the second locking element is flexible and resilient such that two panels, can be mechanically joined by displacement of said two panels horizontally towards each other, while at least the portion of the second locking element at said second edge is resiliently displaced vertically into the space, until said adjacent edges of the two panels are brought into engagement with each other horizontally and the second locking element at said second edge is displaced towards its initial position against the first locking element at the first edge, wherein the second locking element is made of polymer material, and wherein the second locking element is made of a moulded or extruded polymer material reinforced with glass fiber.

15. The method of claim 14, wherein the second locking element is spaced from a corner portion.

16. The flooring system as claimed in claim 14, wherein a location and a shape of the second locking element accommodates said mechanical joining by displacement of said two panels horizontally towards each other.

17. A method of assembling a flooring system comprising a plurality of floor panels with edges which are mechanically connectable to each other along pairs of adjacent edges, said floor panels being provided with tongue and groove formed in one piece with the panels for mechanically locking together said adjacent edges at right angles to the principal plane of the panels, said panels being provided with a first locking element at one first edge formed in one piece with the panel and a locking groove at an opposite second edge, the locking groove being open towards a rear side or a front side of the panel, the second edge further comprising a locking element groove adjacent the locking groove, the locking element groove including a bottom, and each panel being provided with a second locking element, formed of a separate material, wherein the second locking element has a groove portion that is located in the locking element groove of the same edge and a projecting portion that is located outside the locking element groove, and wherein the projecting portion is located outside the locking element groove prior to engagement between the panels, and a space exists between the bottom of the locking element groove and the projecting portion of the second locking element prior to engagement between the panels, the method comprising:
forming a vertical mechanical connection between the panels with the tongue and groove, and
locking the panels to each other horizontally parallel to the principal plane and at right angles to the joint edges with the first and second locking elements, by displacing said two panels horizontally towards each other, while at least a part of the second locking element at said second edge is resiliently displaced vertically into the space, until said adjacent edges of the two panels are brought into engagement with each other horizontally and the second locking element at said second edge is displaced towards its initial position against the first locking element at the first edge, wherein a location and a shape of the second locking element accommodates said mechanical joining by displacement of said two panels horizontally towards each other.

18. The method of claim 17, wherein the second locking element has a groove portion located in the locking element groove and a projecting portion located outside the locking element groove which are displaced towards each other when the panels are displaced horizontally.

19. The method of claim 18, wherein the displacement of the second locking element is not effected until a part of the tongue is in the groove.

* * * * *